United States Patent
Prasad et al.

(10) Patent No.: US 9,614,731 B2
(45) Date of Patent: Apr. 4, 2017

(54) SCALABLE PROVISIONING OF VIRTUAL OPTICAL NETWORK DEMANDS

(71) Applicant: FUJITSU LIMITED, Kawasaki-shi, Kanagawa (JP)

(72) Inventors: Mukul R. Prasad, San Jose, CA (US); Indradeep Ghosh, Cupertino, CA (US); Fan Yu, San Jose, CA (US); Paparao Palacharla, Richardson, TX (US); Xi Wang, Murphy, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/791,090

(22) Filed: Jul. 2, 2015

(65) Prior Publication Data

US 2017/0005869 A1    Jan. 5, 2017

(51) Int. Cl.
| | |
|---|---|
| *H04Q 11/00* | (2006.01) |
| *H04L 12/24* | (2006.01) |
| *H04L 12/713* | (2013.01) |

(52) U.S. Cl.
CPC ........ *H04L 41/0893* (2013.01); *H04L 45/586* (2013.01); *H04Q 11/0066* (2013.01); *H04Q 2011/0079* (2013.01)

(58) Field of Classification Search
None
See application file for complete search history.

(56) References Cited

U.S. PATENT DOCUMENTS

| | | |
|---|---|---|
| 2014/0099118 A1 | 4/2014 | Zhang et al. |
| 2014/0099119 A1 | 4/2014 | Wei et al. |
| 2014/0226985 A1 | 8/2014 | Patel et al. |
| 2015/0104172 A1 | 4/2015 | Wang et al. |

OTHER PUBLICATIONS

"Virtual Network Embedding: A Survey", Andreas Fischer et al., Feb. 2013.
"Flexible Virtual Network Provisioning over Distance-Adaptive Flex-Grid Optical Networks", Xi Wang et al., OFC 2014, Mar. 9, 2014.
"Optimal allocation of virtual optical networks for the future internet", Albert Pagès et al., ONDM 2012, Apr. 17, 2012.
"Survivable Virtual Optical Network Mapping in Flexible-Grid Optical Networks", Weisheng Xie et al., ICNC 2014. Feb. 3, 2014.

*Primary Examiner* — Darren E Wolf
(74) *Attorney, Agent, or Firm* — Maschoff Brennan

(57) ABSTRACT

A method of mapping virtual optical networks (VONs) to a physical network that includes physical links that connect physical nodes. The method includes reading physical network information, VON demands, and technology constraints of the physical network. The method includes determining whether an iteration parameter violates an iterative condition that determines whether to continue processing the VON demands. If not, the method includes determining whether there are unprocessed subgroups of the VON demands. In response to there being unprocessed subgroups, the method includes selecting a subgroup of the VONs. The method includes computing feasible mapping patterns for the subgroup of the VONs. The method includes finding a size of a largest subset of the subgroup that has a feasible mapping and slot assignment solution. The method includes finding a mapping solution of the subset that has a feasible slot assignment and a slot assignment of the mapping solution.

20 Claims, 14 Drawing Sheets

SCALABLE PROVISIONING OF VIRTUAL OPTICAL NETWORK DEMANDS

FIELD

The embodiments discussed herein are related to scalable provisioning of virtual optical network demands.

BACKGROUND

Telecommunication, cable television, and data communication systems use optical networks to rapidly convey information between remote points. In the optical networks, information is conveyed in the form of optical signals through optical fibers, which may also be referred to as a lightpath.

Software-defined networking (SDN) is a step in network virtualization and abstraction. SDN may enable a logical network entity to be instantiated automatically using software instructions. In this manner, SDN may enable flexible definitions of virtual networks. For example, using Open-Flow communications protocol managed by The Open Network Foundation (ONF), a traffic flow entity may be instantiated using an arbitrary combination of layer identifiers defined in a header space. OpenFlow may use various combinations of traffic identifiers (e.g., Internet-protocol (IP) addresses, media access controller (MAC) addresses, port addresses, etc.) at various layers to define a traffic flow. By installing and configuring packet-forwarding rules associated with the flow to physical switches, an OpenFlow controller may ensure that the traffic flow entity instantiates a path that is routed through a network including the physical switches.

FlowVisor is an example of a network virtualization layer of OpenFlow. FlowVisor may instantiate a virtual network entity (called a "slice") by associating multiple traffic flow entities with a given slice, whereby each slice is managed by a separate tenant controller, allowing the tenant control over a portion of network traffic and a subset of the physical network. In OpenFlow, multiple flowspaces may be defined for each network switch. Each flowspace may be associated with a slice, which in turn is managed by a separate controller. FlowVisor may ensure that actions in one slice do not affect another by intercepting and rewriting OpenFlow messages.

The principles and features of SDN technologies were initially deployed with a focus on internet protocol (IP) and Ethernet networks. However, the concept of SDN may be introduced to optical networks as well. For example, the SDN concept may be applied to agile optical networks built using colorless/directionless/flex-grid reconfigurable optical add-drop multiplexers (ROADMs) and programmable transponders for multiple modulation formats. An SDN-enabled optical network may be referred to as a Software-Defined Optical Network (SDON), which may be more open, programmable, and application aware. A feature of SDON is optical network virtualization, which may enable network service providers to provision multiple coexisting and isolated virtual optical networks (VONs) over the same physical infrastructure. For example, in conventional optical networks, network services are provided in terms of lightpaths (i.e., optical network paths between given endpoints). In SDONs, network services may be provided in terms of VONs. When provisioning VONs in response to a request, different mapping patterns for mapping VONs to a physical network may be possible.

Accordingly, network services may be provided as VONs in a SDON in place of conventional lightpaths. VON provisioning may be distinguishable from conventional lightpath provisioning in certain aspects. For example, a lightpath may be a point-to-point connection, while a VON may include a network of multiple virtual nodes and virtual links. Each virtual node in a VON may be mapped to a physical node of a physical network, while each virtual link in a VON may be mapped to one or more physical links connecting the physical nodes. In certain embodiments, virtual links for a particular VON may be provisioned collectively, rather than individually. In this manner, a VON demand may be served when all virtual links have been successfully mapped to physical links under the desired criteria for the VON demand.

Furthermore, a particular lightpath may have a fixed source and destination node. In a VON, the virtual node to physical node mapping may be flexible. For example, a virtual node may be mapped to any physical node within a certain geographic area or among a certain number of specified physical nodes, as long as a resulting physical SDON slice satisfies the service-level agreement of the VON. Such flexibility may empower a network service provider to optimize resource usage and reduce service provisioning costs.

VON provisioning may generalize the concept of optical networking service from point-to-point fixed-node-pair lightpath provisioning to multi-point flexible-nodes, or group optical network slicing. Because a lightpath may be a particular instance of a VON including two virtual nodes, each with a fixed node mapping, an SDON service provider may have backward-compatibility to lightpath provisioning with little to no modification of its VON service provisioning system.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of mapping virtual optical networks (VONs) to a physical network that includes one or more physical nodes and one or more physical links that connect the physical nodes. The method may include reading physical network information representative of characteristics of the physical nodes and the physical links, one or more VON demands, and one or more technology constraints of the physical network. The method may include determining whether an iteration parameter violates an iterative condition that determines whether to continue processing the VON demands. In response to the iteration parameter not violating the iterative condition, the method may include determining whether there are unprocessed subgroups of the VON demands. In response to there being one or more unprocessed subgroups, the method may include selecting a subgroup of the VONs. The method may include computing feasible mapping patterns for the subgroup of the VONs. The method may include finding a size of a largest subset of the subgroup that has a feasible mapping and slot assignment solution. The method may include finding a mapping solution of the subset that has a feasible slot assignment. The method may include finding a slot assignment of the mapping solution.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

For many physical networks, multiple virtual optical network (VON) demands may be serviced at any given time. Some physical networks may include a large number of physical nodes, physical links, and optical transmission slots (slots), such that determining an optimal software-defined optical network (SDON) mapping solution to the physical network may involve significant computational resources and increased computation times. This computational complexity tends to increase with multiple VON demands for a given physical network.

Heuristic mapping processes may process each VON demand separately to assign a heuristic best-fit mapping pattern to a VON demand. Heuristic mapping processes may be computationally efficient, but they may not provide an optimal mapping solution because all VON demands may not be considered together to find a best-fit mapping pattern and certain permutations of multiple VON demands may go unexplored resulting in reduced VON provisioning. As a result, an overall capacity utilization of a physical network may not be optimal.

Exhaustive enumeration mapping processes considering some or all possible mapping patterns may be performed for VON demands to theoretically find an optimal mapping solution. However, computational resources and time for exhaustive enumeration may be prohibitively expensive and inflexible to effectively respond to VON demands in a practical manner in some scenarios.

Accordingly, some embodiments described herein are configured to provision as many VON demands as possible. In an example embodiment a SDON mapping solution may be generated during multiple iterations in which a subgroup of VONs is processed. For each of the subgroups, some or all feasible mapping patterns are computed. A size of a largest subset of a subgroup that has a feasible mapping and slot assignment solution is found. Additionally, a best-cost mapping solution of the subset and a best-cost slot assignment of the mapping solution may be found. The VON demand provisioning process may continue until a stopping criterion is reached and/or some or all of the VONs are included on the mapping solution. The mapping solution may be communicated to and implemented in a physical network.

In the following description, details are set forth by way of example to facilitate discussion of the disclosed subject matter. The disclosed embodiments are examples and not exhaustive of all possible embodiments. Embodiments of the present invention will be explained with reference to the accompanying drawings.

Figure 1A:
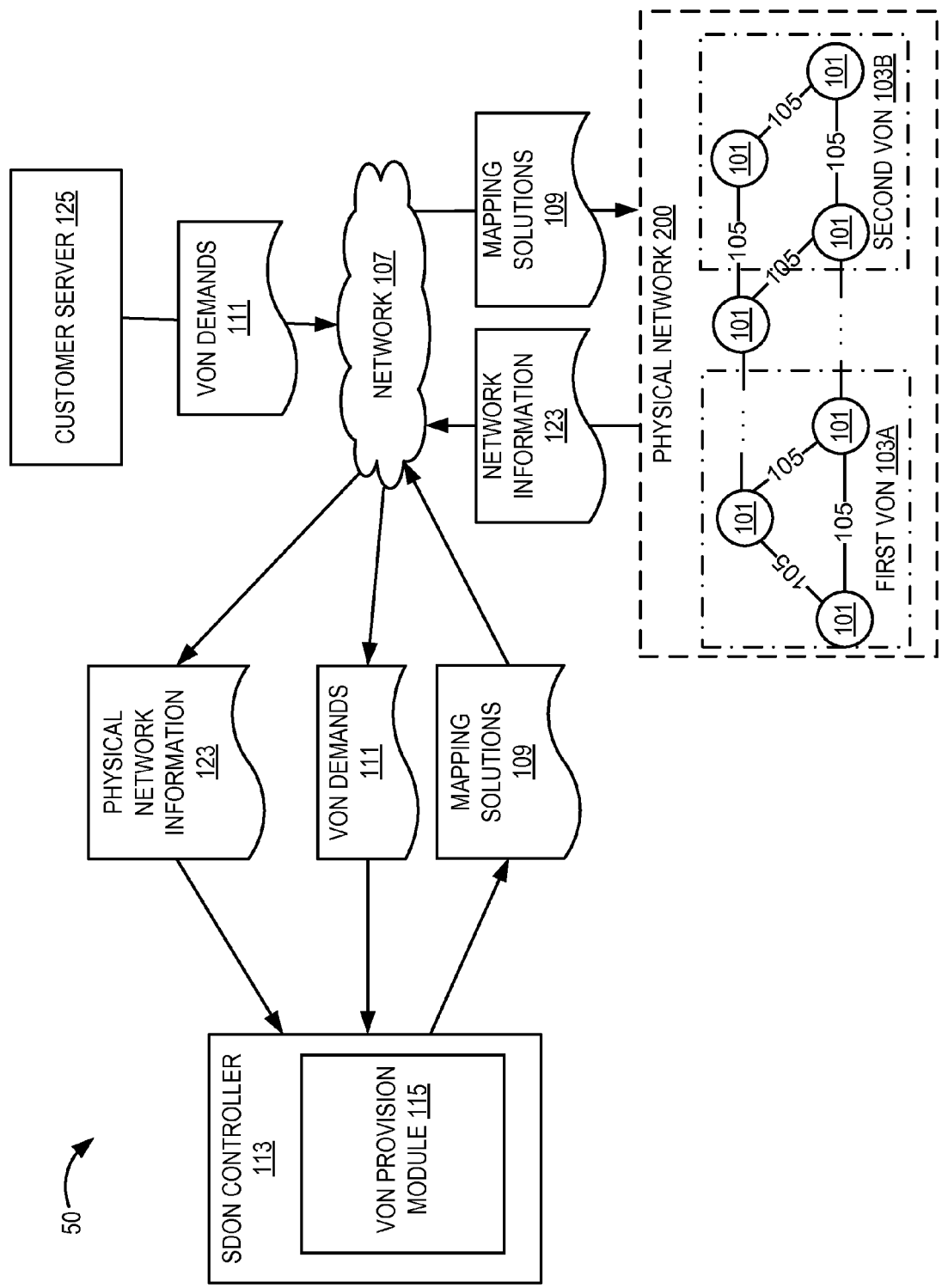
FIG. 1A illustrates a block diagram of an example operating environment in which some embodiments may be implemented.

FIG. 1A illustrates an example operating environment 50 in which some embodiments may be implemented. In the operating environment 50, mapping solutions 109 may be generated by an SDON controller 113. The mapping solutions 109 may be communicated to and implemented in a physical network 200. For example, the mapping solutions 109 may configure a subset of physical nodes 101 and/or a subset of physical links 105 in accordance with the mapping solutions 109.

The mapping solutions 109 may be generated based on VON demands 111 and/or physical network information 123. The VON demands 111 may be communicated to the SDON controller 113 by a customer server 125. The physical network information 123 may be read or otherwise accessed from the physical network 200.

The operating environment 50 includes the SDON controller 113, the customer server 125, and the physical network 200. The SDON controller 113, the customer server 125 and the physical network 200 (collectively, "environment components") may communicate information (e.g., 123, 111, 109) via a network 107. Each of the environment components and the network 107 are briefly described below.

The network 107 may include a wired network, a wireless network, or any combination thereof. The network 107 may include any suitable configuration or configurations including a star configuration, token ring configuration, or other configurations. The network 107 may include a local area network (LAN), a wide area network (WAN) (e.g., the Internet), and/or other interconnected data paths across which multiple devices may communicate. In some embodiments, the network 107 may include a peer-to-peer network. The network 107 may also be coupled to or include portions of a telecommunications network that may enable communication of data in a variety of different communication protocols. In some embodiments, the network 107 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and the like. In the operating environment 50, the network 107 is depicted separately from the physical network 200. In some embodiments, the network 107 or some portion thereof may be included in or make up one or more of the physical links 105 of the physical network 200.

The customer server 125 may include a processor-based computing system. For example, the customer server 125 may include a hardware server or another processor-based computing system configured to function as a server. The customer server 125 may include memory and network communication capabilities. In the operating environment 50, the customer server 125 may be configured to communicate with the SDON controller 113 and/or the physical network 200 or a component thereof. The customer server 125 may be associated with a customer or another entity that requests a VON constructed on the physical network 200.

The customer server 125 may communicate the VON demands 111 to the SDON controller 113. The VON demands 111 may include one or more virtual nodes, one or more candidate physical nodes, and one or more virtual links. Some examples of the VON demands 111 are provided elsewhere in this disclosure. Based on the VON demands 111, mapping solutions 109 may be generated, which may be implemented in the physical network 200 to configure a first VON 103A and a second VON 103B.

The physical network 200 may include the physical nodes 101 and the physical links 105. The physical nodes 101 may be communicatively coupled via the physical links 105. One or more of the physical nodes 101 may include a server or another network component such as a repeater and/or a hub.

The physical links 105 may include any network hardware component that communicatively links the physical nodes 101. For example, the physical links 105 may include one or more hardware components described with reference to the network 107. The physical links 105 and the physical nodes 101 are configurable based on mapping solutions 109 generated by the SDON controller 113.

In the depicted embodiment, the SDON controller 113 is depicted outside the physical network 200. In some embodiments, the SDON controller 113 may be included in the physical network 200. For instance, the SDON controller 113 may be included in one or more of the physical nodes 101.

The SDON controller 113 may include a processor-based computing system. For example, the SDON controller 113 may include a hardware server or another processor-based computing system configured to function as a server. The SDON controller 113 may include memory and network communication capabilities. In the operating environment 50, the SDON controller 113 may be configured to communicate with the customer server 125 and/or the physical network 200 or a component thereof.

The SDON controller 113 may include a VON provision module 115. The VON provision module 115 may be configured to perform a VON demand provisioning process. The VON demand provisioning process may generate the mapping solutions 109 based on the physical network information 123 and/or the VON demands 111.

The VON provision module 115 may communicate the mapping solutions 109 to the physical network 200. The mapping solutions 109 may be implemented in the physical network 200 to configure one or more of the physical nodes 101 and the physical links 105 to create the first VON 103A and/or the second VON 103B, for instance.

In some embodiments, the VON provision module 115 may be configured to generate the mapping solutions 109 during one or more iterations. For example, during the iterations, a subgroup of unmapped VONs (e.g., 103A and 103B) of a particular size may be processed. The VON provision module 115 may be configured to compute some or all feasible mapping patterns for one or more of the constituent VONs of the subgroups. The VON provision module 115 may find a size of a largest subset of a subgroup of the VONs that has a feasible mapping and slot assignment solution. The VON provision module 115 may find a best-cost mapping solution of the subset that has a feasible slot assignment and a best-cost slot assignment of the mapping solution may be found. The VON provision module 115 may continue the VON demand provisioning process until a stopping criterion is reached.

The VON provision module 115 may be implemented using hardware including a processor, a microprocessor (e.g., to perform or control performance of one or more operations), a field-programmable gate array (FPGA), or an application-specific integrated circuit (ASIC). In some other instances, the VON provision module 115 may be implemented using a combination of hardware and software. Implementation in software may include rapid activation and deactivation of one or more transistors or transistor elements such as may be included in hardware of a computing system (e.g., the customer server 125, the SDON controller 113, and the physical network 200). Additionally, software defined instructions may operate on information within transistor elements. Implementation of software instructions may at least temporarily reconfigure electronic pathways and transform computing hardware.

Modifications, additions, or omissions may be made to the operating environment 50 without departing from the scope of the present disclosure. Specifically, the operating environment may include one or more SDON controllers, one or more customer servers, one or more physical networks, or any combination thereof. Moreover, the separation of various components in the embodiments described herein is not meant to indicate that the separation occurs in all embodiments. It may be understood with the benefit of this disclosure that the described environment components may be integrated together in a single component or separated into multiple components. For example, the SDON controller 113 may be included in one or more of the physical nodes 101.

In the operating environment 50, memory in one or more of the environment components may be similar to memory 508 described with reference to FIG. 5, processors in one or more of the environment components may be similar to a processor 504 described with reference to FIG. 5, and network communication capabilities of one or more of the environment components may be provided by a communication unit 502 described with reference to FIG. 5.

Figure 1B:
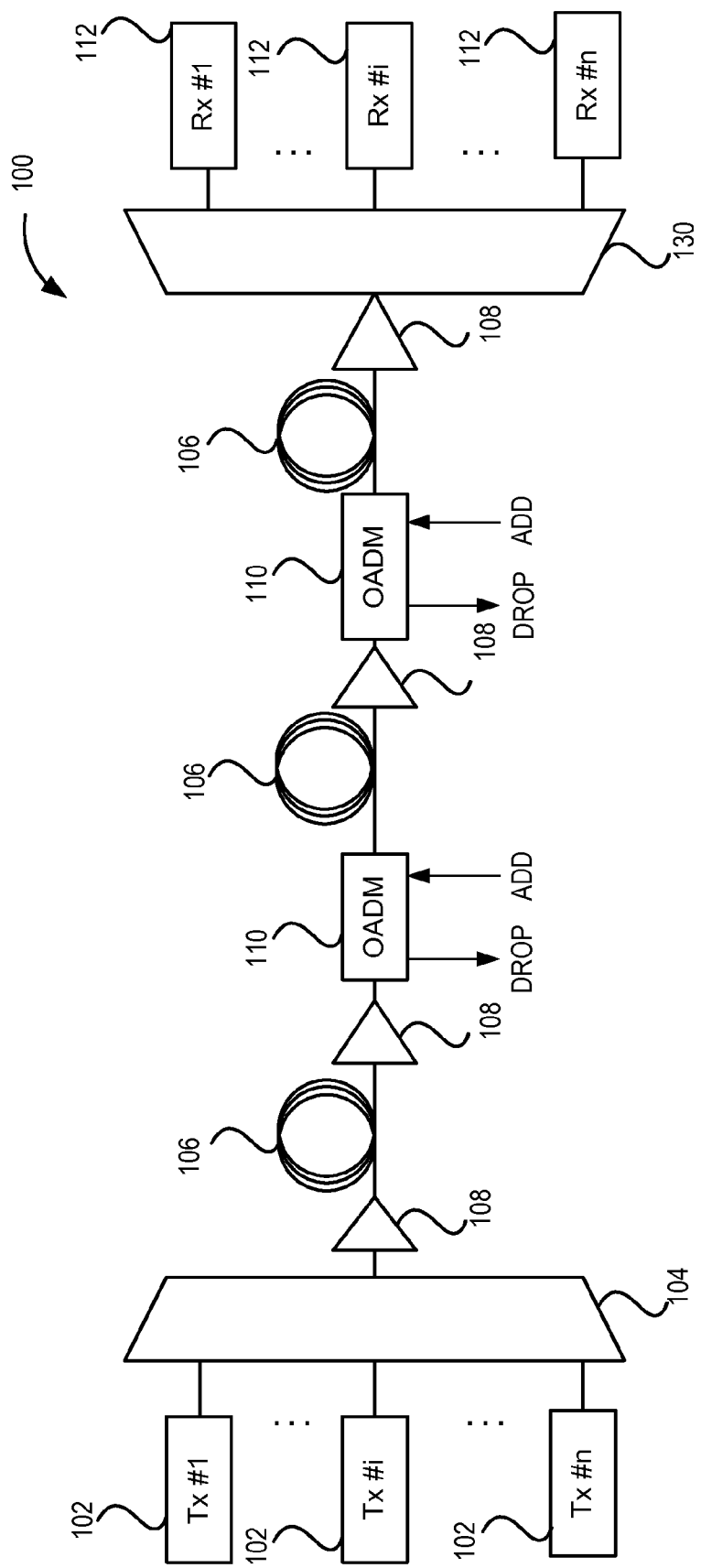
FIG. 1B illustrates a block diagram of an example network that may be implemented in the operating environment of FIG. 1.

FIG. 1B illustrates an example network 100, which may represent an optical communication system that may be implemented in the operating environment 50 of FIG. 1A. The network 100 may include one or more optical fibers 106 configured to transport one or more optical signals communicated by components, such as network elements, of the network 100. The network elements of the network 100 may be coupled together by the optical fibers 106 and may include one or more transmitters 102, one or more multiplexers 104, one or more optical amplifiers 108, one or more optical add/drop multiplexers (OADM) 110, one or more demultiplexers 130, and one or more receivers 112, among potentially other network elements (not shown).

The network 100 may include a point-to-point optical network with terminal nodes, a ring optical network, a mesh optical network, or any other suitable optical network or combination of optical networks. The optical fibers 106 may include thin strands of glass capable of communicating light signals over long distances with very low loss. The optical fibers 106 may include any suitable type of fiber selected from a variety of different fiber types.

Information may be transmitted and received through the network 100 by modulating one or more wavelengths of light and encoding information on the one or more wavelengths of light. In optical networking, a wavelength of light may also be referred to as a channel, a spectral slot, or a slot. Each slot may be configured to carry a certain amount of information through the network 100.

In some embodiments, multiple light signals may be simultaneously transmitted through a single fiber utilizing multiple wavelengths (each wavelength representing a slot) by combining the slots into a single wideband optical signal using wavelength division multiplexing (WDM). Coarse wavelength division multiplexing (CWDM) refers to the multiplexing of wavelengths that are widely spaced on a low number of slots, typically greater than 20 nanometers (nm) and less than sixteen wavelengths. Dense wavelength division multiplexing (DWDM) refers to the multiplexing of wavelengths that are closely spaced with a large number of slots, typically less than 0.8 nm spacing and greater than forty wavelengths. WDM or other multi-wavelength multiplexing transmission techniques are employed in optical networks to increase the aggregate bandwidth per optical fiber. Without WDM, the bandwidth in optical networks may be limited to the bit-rate of one wavelength. The network 100 may be configured to transmit disparate channels using WDM or some other suitable multi-channel multiplexing technique.

The transmitters (in FIG. 1B, "Tx") 102 may be configured to transmit optical signals through the network 100 in specific wavelengths. Each of the transmitters 102 may include a system, apparatus, or device configured to convert electrical signals into optical signals for transmission. The transmitters 102 may each include a laser and a modulator to receive electrical signals and modulate information contained in the electrical signals onto a beam of light produced by the laser at a particular wavelength and transmit the beam of light through one or more portions of the network 100. The term "light" is used generically herein to refer to electromagnetic radiation of any suitable wavelength, and may include light with wavelengths of, e.g., about 800-900 nm, 1360-1460 nm, 1530-1565 nm, or other suitable wavelengths.

The multiplexers 104 may be optically coupled to the transmitters 102 and may include a system, apparatus, or device configured to combine the light beams transmitted by transmitters 102 at different wavelengths into a WDM signal comprising multiple channels, or slots propagating on a common optical path (e.g., within optical fibers 106).

The optical amplifiers 108 may amplify the WDM signal within the network 100 and may be positioned before and/or after certain lengths of the optical fibers 106. The optical amplifiers 108 may include a system, apparatus, or device configured to amplify WDM signals. In at least one embodiment, the optical amplifiers 108 may include optical repeaters that amplify the WDM signal. This amplification may be performed with opto-electrical or electro-optical conversion. In some embodiments, the optical amplifiers 108 may include optical fibers 106 doped with a rare-earth element to form doped fiber amplification elements such that, when a signal passes through the fibers, external energy may be applied in the form of a pump signal to excite atoms of the doped portion of the optical fibers 106 to increase the intensity of the WDM signal. In one embodiment, the optical amplifiers 108 include erbium-doped fiber amplifiers (EDFA).

The OADMs 110 may be coupled to the network 100 via the optical fibers 106. The OADMs 110 may include add/drop modules, which may include a system, apparatus, or device configured to add and/or drop optical signals at individual wavelengths from the optical fibers 106. Optical signals may travel along the optical fibers 106 directly to a destination, or optical signals may be passed through one or more additional OADMs 110 and/or optical amplifiers 108 before reaching a destination.

The network 100 may also include one or more demultiplexers 130 at one or more destinations of the network 100. The demultiplexers 130 may include a system, apparatus, or device that acts as a demultiplexer by splitting a single composite WDM signal into individual channels at respective wavelengths on different optical paths. In one non-limiting example, the network 100 may transmit and carry a forty channel DWDM signal. The demultiplexer 130 may divide the forty channel DWDM signal into forty separate optical signals according to the forty different channels and may direct each of the separate optical signals to a corresponding one of the receivers 112.

In certain embodiments of the network 100, the OADMs 110 may represent reconfigurable OADMs (ROADMs) that are capable of adding or dropping individual or multiple wavelengths of a WDM signal. The individual or multiple wavelengths may be added or dropped in the optical domain, for example, using a wavelength selective switch (WSS) (not shown) which may be included in a ROADM.

The receivers 112 may be optically coupled to the demultiplexers 130. Each receiver 112 may be configured to receive a corresponding one of the separate optical signals from the demultiplexers 130 and may process the optical signals to obtain data carried by the optical signals. For example, each receiver 112 may generate an electrical data signal representative of a corresponding optical signal incident thereon. Accordingly, the network 100 may include at least one receiver 112 for each channel, or slot, of the network 100.

Optical networks may employ modulation techniques to convey information contained within optical signals. Example modulation schemes may include, but are not limited to: phase-shift keying (PSK), frequency-shift keying (FSK), amplitude-shift keying (ASK), and quadrature amplitude modulation (QAM), among others. In PSK, information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, information carried by the optical signal may be conveyed by modulating both the amplitude and phase of the carrier wave. PSK may be considered a subset of QAM, where the amplitude of the carrier waves is maintained constant. Additionally, polarization division multiplexing (PDM) technology may enable a greater bit rate for transmitting information. PDM transmission includes modulating information onto various polarization components of an optical signal associated with a channel. The polarization of an optical signal may generally refer to the direction of oscillations of the optical signal. The term "polarization" may generally refer to the path traced out by the tip of the electric field vector of the optical signal at a point in space, which may be perpendicular to the propagation direction of the optical signal.

Optical networks may have a physical layer including a management plane, a control plane, and a transport plane (not shown). A central management host (not shown) may reside in the management plane and may be configured to supervise the components of the control plane. The management plane may have ultimate control over transport plane entities, control plane entities, and network elements. As one non-limiting example, the management plane may consist of a central processing center (e.g., a central management host), including one or more processing resources and data storage components. The management plane may be in electrical communication with the elements of the control plane and may also be in electrical communication with one or more network elements of the transport plane. The management plane may perform management functions for an overall system and provide coordination between network elements, the control plane, and the transport plane. In some examples, the management plane may include an element management system (EMS) that handles one or more network elements from the perspective of the network elements, a network management system (NMS) which handles devices from the perspective of the network, and/or an operational support system (OSS) which handles network-wide operations.

Modifications, additions, or omissions may be made to the network 100 without departing from the scope of the disclosure. For example, the network 100 may include more or fewer elements than those depicted in FIG. 1B. Additionally, the network 100 may include other elements not expressly shown, such as a dispersion compensation module (DCM). The network 100 may include any suitable network topology for transmitting optical signals such as a ring, a mesh, and/or a hierarchical network topology.

Figure 2A:
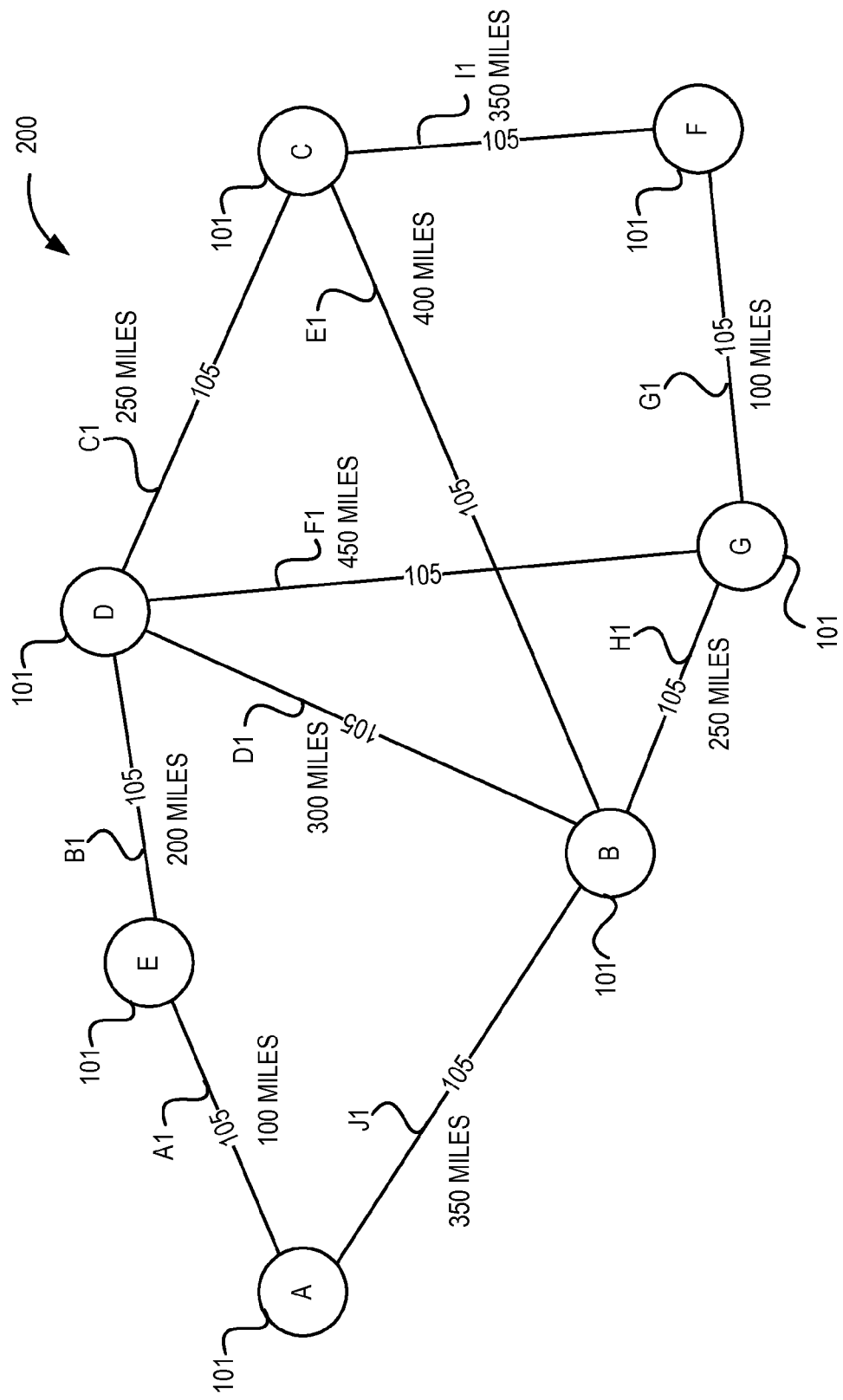
FIG. 2A is an example map of a physical network that may be implemented in the operating environment of FIG. 1A.

FIG. 2A illustrates an example of the physical network 200. The physical network 200 may include the physical nodes 101 connected to each other by the physical links 105. The physical network 200 may include or correspond to the network 100 of FIG. 1B or include one or more of the components of the network 100. The physical nodes 101 are labeled A, B, C, D, E, F, and G in FIG. 2A. The physical links 105 are labeled A1, B1, C1, D1, E1, F1, G1, H1, I1, and J1 in FIG. 2A. The physical links A1-J1 span between two of the physical nodes A-G. In FIG. 2A, a length of each of the physical links A1-J1 are included below the physical link labels. In the physical network 200 of FIG. 2A, the distances are in miles. For example, physical link A1 may include a length of 100 miles, which may correspond to a distance between physical node A and physical node E.

One or more of the physical nodes A-G may include or represent a computer system such as a processor-based server as discussed above. The physical nodes A-G may include one or more of the components (e.g., 102, 104, 130, 106, 108, 110, and 112) discussed with reference to FIG. 1B. The physical nodes A-G may actively route data and information to other physical nodes A-G via one or more of the physical links A1-J1. Which of the physical nodes A-G and via which physical links A1-J1 may be conformed according to a VON demand (e.g., VON demands 111 of FIG. 1A). The physical nodes A-G may include memory and one or more processors. In some embodiments, one or more of the physical nodes A-G may include an SDON controller (e.g., SDON controller 113 of FIG. 1A). The SDON controller may perform or cause performance of one or more of the VON provisioning processes described in this disclosure.

One or more of the physical links A1-J1 may be configured to communicate data and information between two or more of the physical nodes A-G. For example, transmission of data between the physical node A and the physical node B may be via the physical link J1. The physical links A1-J1 may include one or more of the components (e.g., 102, 104, 130, 106, 108, 110, and 112) discussed with reference to FIG. 1B. In some embodiments, the physical links A1-J1 may include two or more slots. The slots may include wavelengths of optical signals communicated thereon.

The physical network 200 of FIG. 2A is not necessarily drawn to scale and may illustrate approximate relative locations of physical nodes in relation to each other. Moreover, it may be understood with the benefit of this disclosure, that while processes described in this disclosure are discussed with reference to the physical network 200, these processes may be applicable to any physical network that includes physical nodes, physical links, and provisioning capabilities as detailed elsewhere in this disclosure.

In some circumstances, customers may request a particular VON to be built virtually using the physical network 200. The characteristics of the particular VON may be requested in the VON demand. The VON demand may include a network topology that may include one or more virtual nodes and one or more virtual links. The virtual nodes may include a set of physical nodes (e.g., the physical nodes A-G) to which the virtual node may be mapped. The set of physical nodes to which the virtual nodes may be mapped are referred to as candidate physical nodes. To realize the VON demand, one or more mapping patterns may be developed in using the physical network 200.

Figure 2B:
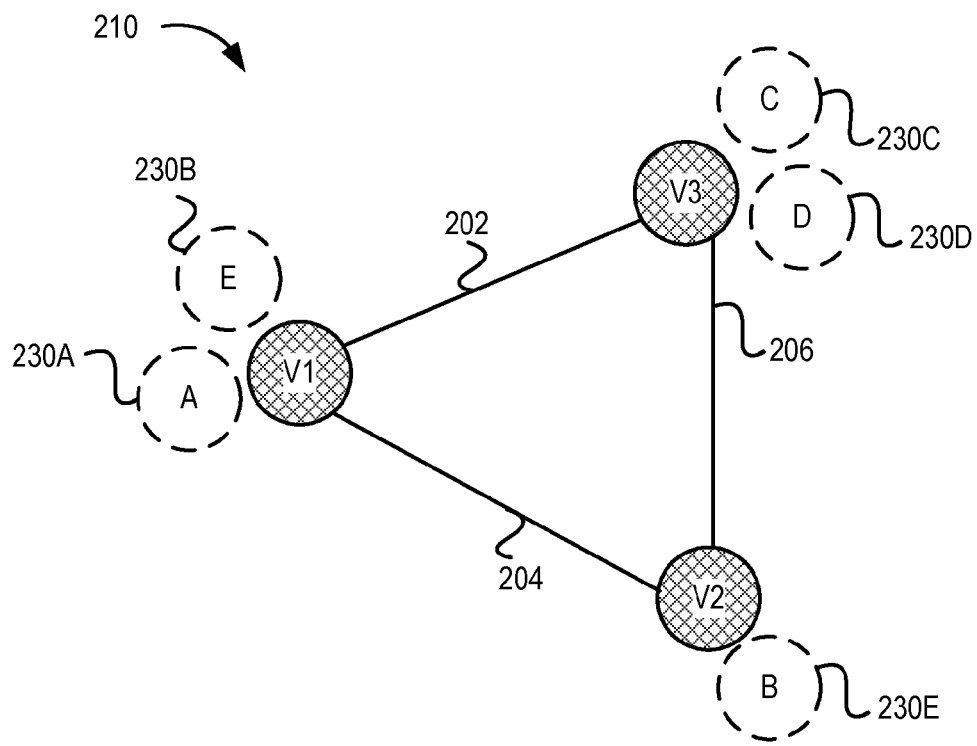
FIG. 2B illustrates an example VON demand.
Figure 2C:
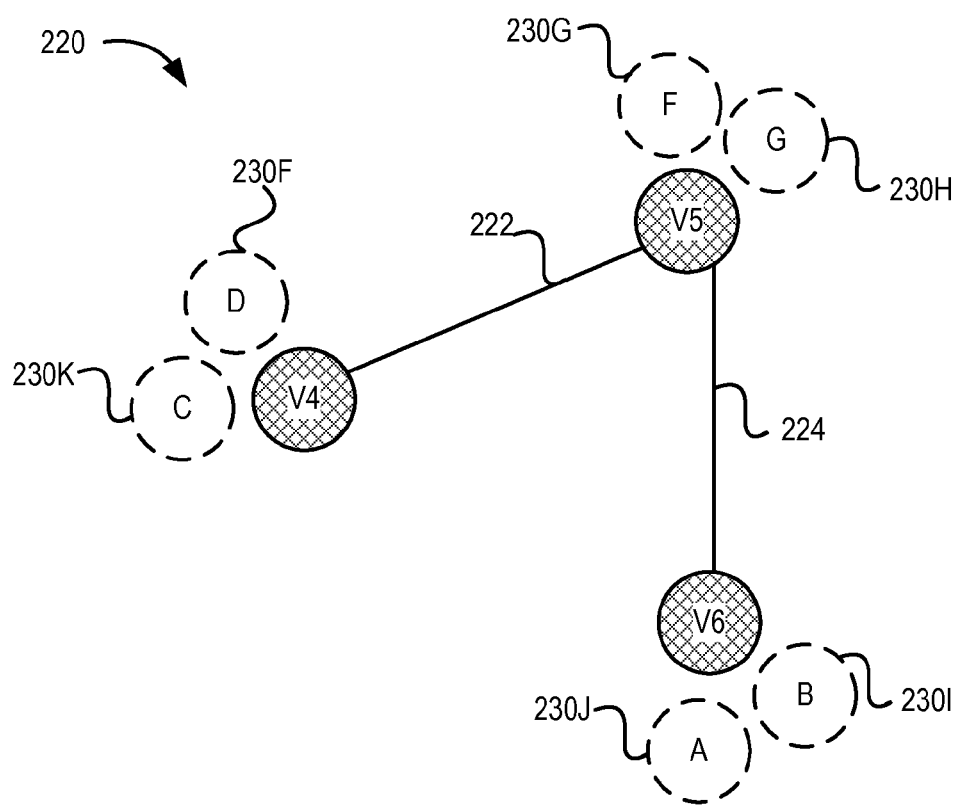
FIG. 2C illustrates another example VON demand.

FIGS. 2B and 2C illustrate a first VON demand 210 and a second VON demand 220 (collectively, VON demands 210/220), respectively. The first VON demand 210 and the second VON demand 220 may be examples of VON demands 111 of FIG. 1A. The first VON demand 210 may be for the first VON 103A and the second VON demand 220 may be for the second VON 103B, for example. In the example detailed in the following paragraphs, the VON demands 210/220 may be mapped to the physical network 200 of FIG. 2A according to a VON demand provisioning process. In this example, each of the physical links A1-J1 of FIG. 2A in the physical network 200 includes two slots. It may be understood with the benefit of this disclosure that the following discussion is one example VON provisioning. Accordingly, the VON demand provisioning process may be applied to other VON demands and/or other physical networks that may include another numbers of slots in each of the physical links A1-J1.

In FIG. 2B, the first VON demand 210 specifies a first virtual node V1, a second virtual node V2, and a third virtual node V3 (generally, virtual nodes V1, V2, V3, or combinations thereof). The first VON demand 210 further specifies three virtual links 202, 204, and 206 that connect the virtual nodes V1, V2, and V3. Specifically, a first virtual link 202 connects the virtual nodes V1 and V3, a second virtual link 204 connects the virtual nodes V1 and V2, and a third virtual link 206 connects virtual nodes V2 and V3.

The first VON demand 210 may include candidate physical nodes 230A-230E. The candidate physical nodes 230A-230E represent a set of the physical nodes A-G in the physical network 200 to which the virtual nodes V1-V3 may be mapped. The candidate physical nodes 230A-230E for each of the virtual nodes V1-V3 are depicted with dashed lines and positioned adjacent to corresponding virtual nodes V1-V3. For example, the first virtual node V1 may correspond to candidate physical node 230A, which includes physical node A, and to candidate physical node 230B, which includes physical node E. The candidate physical nodes 230C and 230D correspond to the virtual node V3 and candidate physical node 230E corresponds to virtual node V2.

Each of the virtual nodes V1-V3 may be mapped to one of the corresponding candidate physical nodes 230A-230E to form unique mapping patterns. In general, when forming the mapping patterns, two of the virtual nodes V1, V2, and V3 may not be mapped to the same candidate physical node 230A-230E. Accordingly, with reference to first VON demand 210, there are four possible mapping patterns. The mapping patterns for the first VON demand 210 are listed in Table 1:

TABLE 1

Mapping patterns for first VON Demand 210.

| Mapping Patterns (first VON) | V-1 | V-2 | V-3 |
|---|---|---|---|
| MP01 | A | B | C |
| MP02 | A | B | D |
| MP03 | E | B | C |
| MP04 | E | B | D |

In FIG. 2C, the second VON demand 220 specifies a fourth virtual node V4, a fifth virtual node V5, and a sixth virtual node V6 (generally, virtual nodes V4, V5, V6, or combinations thereof). The second VON demand 220 further specifies two virtual links 222 and 224. The virtual links 222 and 224 connect the virtual nodes V4-V6. Specifically, a fourth virtual link 222 connects virtual nodes V4 and V5 and a fifth virtual link 224 connects virtual nodes V5 and V6.

The second VON demand 220 may include candidate physical nodes 230E-230K, which are similar to the candidate physical nodes 230A-230E discussed above. As above, the candidate physical nodes 230E-230K for each of the virtual nodes V4-V6 are depicted with dashed lines and positioned adjacent to a corresponding virtual node V4-V6. For example, the fourth virtual node V4 may correspond to candidate physical nodes 230K and 230F, which include physical nodes C and D. The fifth virtual node V5 may correspond to candidate physical nodes 230G and 230H, which include physical nodes F and G. The sixth virtual node V6 may correspond to candidate physical nodes 2301 and 230J, which include physical nodes A and B.

Each of the virtual nodes V4-V6 may be "mapped" to one of the corresponding candidate physical nodes 230E-230K to form unique mapping patterns. Accordingly, there are eight mapping patterns for the second VON demand 220, which are listed in Table 2:

TABLE 2

Mapping patterns for second VON.

| Mapping Patterns (second VON) | V-4 | V-5 | V-6 |
|---|---|---|---|
| MP05 | C | F | A |
| MP06 | C | F | B |
| MP07 | C | G | A |
| MP08 | C | G | B |

TABLE 2-continued

Mapping patterns for second VON.

| Mapping Patterns (second VON) | V-4 | V-5 | V-6 |
|---|---|---|---|
| MP09 | D | F | A |
| MP10 | D | F | B |
| MP11 | D | G | A |
| MP12 | D | G | B |

VON Demand Provisioning

With combined reference to FIGS. 1A and 2A-2C, the VON demand provisioning process may determine an optimal mapping solution of some or all of the VON demands 111, which may include the VON demands 210 and 220, to the physical network 200. In the VON demand provisioning process, some or all of the VON demands 111 may not be mapped. For example, one or both of the VON demands 210 and/or 220 may not be included in the optimal mapping.

Additionally, the VON demand provisioning process may generate an optimal mapping such that one or more of the VON provisioning criteria are met. The VON provisioning criteria may include: one or more of the virtual nodes V1-V6 being mapped onto one of the corresponding candidate physical nodes 230A-230K; one or more of the virtual links 202, 204, 206, 222, 224 being mapped onto one or more of the physical links A1-J1 in the physical network 200; the mapping solutions being realized on one of the VONs mapping patterns (e.g., first VON 103A from first VON demand 210 is realized on one of MP01-MP04 from Table 1); two of the virtual nodes V1-V6 may not be mapped onto the same physical node A-G; a distance adaptive modulation, e.g., a specific number of slots (per physical link A1-J1) from one of the virtual links 202, 204, 206, 222, and 224 may be a function of a total physical length of the mapped virtual link. An example of the distance adaptive modulation may include if the distance is less than 400 miles, then the mapping solution may include one slot per physical link and if the distance is greater than 400 miles, then the mapping solution may include two slots per link.

Additionally or alternatively, in some embodiment, the VON demand provisioning process may include one or more link capacity constraints. The link capacity constraints may include, for example, limiting the number of available slots per physical link. The VON provisioning criteria may also include one or more of the virtual links V1-V6 being mapped so that it occupies the same slot in each physical link 105 it traverses (e.g., slot continuity); assignment of one or more of the virtual links 202, 204, 206, 222, and 224 to the lowest available slot during mapping, which may minimize network fragmentation; one or more reliability constraints (e.g., no physical node and/or physical link crossings within a mapping solution for a single VON demand); and a cost function that may take into consideration a number of VONs mapped, a total number of physical slots (network utilization), some measure of network fragmentation, another cost function factor, or some combination thereof.

The VON demand provisioning process may begin by the SDON controller 113 reading the physical network information 123. The physical network information 123 may be representative of characteristics (e.g., relative locations, distances, etc.) of the physical nodes 101 and the physical links 105. The SDON controller 113 may also read the VON demands 111 and one or more technology constraints (e.g., number of slots per physical link) of the physical network 200.

In general, the VON demand provisioning process may be performed in one or more iterations. At the beginning of the iterations the VON provision module 115 may determine whether an iteration parameter violates an iterative condition. The iterative condition determines whether to continue processing the VON demands 111 and/or the physical network information 123. For example, in response to the iteration parameter violating the iterative condition, the VON provision module 115 stops processing the VONs. In response to the iteration parameter not violating the iterative condition, the VON provision module 115 continues to process the unmapped VONs on a subgroup-by-subgroup basis.

In some embodiments, the iterative condition may include all of the VONs being mapped, a particular maximum number of iterations are performed, an amount of time is passed, at least one new VON is successfully mapped in the last iteration, or some combination thereof. In these and other embodiments, the iteration parameter may be related to the iterative condition. For example, the iteration parameter may include an all-VON-mapped indicator, an iteration count parameter, a clock parameter, a VON mapping progress tracking parameter, or some combination thereof.

During the iterations, unmapped VONs may be processed one subgroup at a time. For example, in a first iteration, a first subgroup is processed, then in a second iteration a second subgroup is processed, etc. The subgroups may be of a particular size. For example, the unmapped VONs may include the first VON 103A and the second VON 103B. The subgroups may include one of the first VON 103A and the second VON 103B. In embodiments in which large numbers of VONs (e.g., 100) are being mapped to the physical network 200, the subgroups may include ten VONs per iteration, for instance.

The VON provision module 115 computes some or all feasible mapping patterns for the constituent VONs of the subgroup. For example, Tables 1 and 2 provided above are representative of all possible mapping patterns of the first VON demand 210 and the second VON demand 220. From the possible mapping patterns, the VON provision module 115 may determine which of these include feasible mapping patterns in view of the VON provisioning criteria. Some additional details of computing the feasible mapping patterns and an example of an infeasible mapping are provided elsewhere in this disclosure.

The VON provision module 115 may find a size of a largest subset of the subgroup of the VONs that has a feasible mapping and slot assignment solution. For example, the subgroup may include fifteen VONs. The size of the largest subset may include a number of the fifteen VONs (e.g., twelve VONs) that may be mapped to the physical network 200 concurrently without violating the VON provisioning criteria. Some additional details of finding the size are provided elsewhere in this disclosure.

Additionally, the VON provision module 115 may find a best-cost mapping solution of a subset that has a feasible slot assignment. The subset may be of size equal to the largest provisionable subset size computed earlier. In some embodiments, the best-cost mapping solution may be found as described in U.S. application Ser. No. 14/619,032 filed Feb. 10, 2015 and Ser. No. 14/491,702 filed Sep. 19, 2014, which are incorporated herein by reference in their entireties. In some embodiments, finding the best-cost mapping solution may be similar to the finding the best-cost mapping solution of the U.S. application Ser. No. 14/619,032 with one or both extensions described below.

The VON provision module 115 may find a best-cost slot assignment of the mapping solution. In some embodiments, the best-cost slot assignment may be found according to U.S. application Ser. No. 14/619,029 filed Feb. 10, 2015, which is incorporated herein by reference in its entirety.

Following the best-cost slot assignment, it may be determined whether there are unprocessed subgroups of the VON demands. If there are unprocessed subgroups of the VON demands, then the VON provision module 115 may select another subgroup that has not been processed. The feasible mapping pattern may be computed, the size of a largest subset may be found, a mapping solution of the subset may be found, and a slot assignment may be found for the other subgroup.

If there are not unprocessed subgroups of the VON demands, then the iteration parameter may be updated. The VON provision module 115 may determine whether an updated iteration parameter violates the iterative condition. In response to the updated iteration parameter violating the iterative condition, the VON provision module 115 processes unmapped VONs on a subgroup-by-subgroup basis as described above. In response to the updated iteration parameter not violating the iterative condition, the VON demand provisioning process may stop. The VON provision module 115 may output the mapping solutions 109, which may be implemented in the physical network 200.

Feasible Mapping Patterns

In general, to compute the feasible mapping patterns, each of the candidate physical nodes 230A-230K may be chosen for each of the virtual nodes V1-V6 to create a set of mapping patterns for a VON. For example, Table 1 above includes a set of mapping patterns in which each of the candidate physical nodes 230A-230E have been chosen for the first VON demand 210. In the discussion that follows, the initial mapping patterns prior to a feasibility determination are referred to as "abstract" mapping patterns. Accordingly, Table 1 includes a set of abstract mapping patterns.

For each of the set of abstract mapping patterns, paths along the physical links 105 are selected for each of the virtual links (e.g., the virtual links 202, 204, and 206 for the first VON demand 210 or the virtual links 222 and 224 for the second VON demand 220). In the following paragraphs, only the virtual links 202, 204, and 206 are listed although it may be understood that virtual nodes 222 and 224 may be listed if the second VON demand 220 is under consideration. For each of the abstract mapping patterns including the selected paths, it is determined whether the VON provisioning criteria are met. If the VON provisioning criteria are met, then the abstract mapping pattern is feasible. A feasible abstract mapping pattern is referred to as a concrete mapping pattern. If the VON provisioning criteria are not met, then the abstract mapping pattern is infeasible.

In some circumstances, there may be multiple paths of physical links 105 that may be suitable for virtual links 202, 204, and 206 when considering the VON demand 210 (or virtual links 222 and 224 when considering the VON demand 220). The path with the shortest length and that meets the VON provisioning criteria may be selected.

In some embodiments, the VON provisioning criteria that may be considered during computation of the feasible mapping patterns may include: the virtual links 202, 204, and 206 may not have the same physical node 101 as both its end-points; the chosen physical links 105 may have slot-continuous availability of the number of slots required by the virtual links 202, 204, and 206 all along its length; a distance adaptive modulation, which may include a different number of slots for different length of the paths; no node crossing and/or no link crossing; or some combination thereof.

The no node-crossing may include a constraint that may prevent two virtual links virtual links, such as 202, 204, and 206 of the same VON, from sharing any physical nodes 101, except possibly common end-points. The no link-crossing may include a constraint that may prevent two virtual links virtual links, such as 202, 204, and 206 of the same VON, from sharing any common physical link 105. In some embodiments, including the no link-crossing, the physical links 105 previously used may be removed.

In an example embodiment, to compute the feasible mapping patterns, the VON provision module 115 may read the physical network information 123 and the VON demands 111. The VON provision module 115 may then determine whether one or more of the VON demands 111 have already been analyzed. In response to the VON demands 111 being analyzed, the SDON controller 113 may complete the computation of the feasible mapping patterns. In response to the VON demands 111 having not been analyzed, VON provision module 115 may select a VON demand (in this example, the first VON demand 210) of the VON demands 111. The VON demand that is selected has not been analyzed. The VON provision module 115 may combinatorially calculate an abstract mapping pattern set for the first VON demand 210. For example, Table 1 includes the abstract mapping pattern set for the first VON demand 210.

The VON provision module 115 may then initialize a concrete mapping set for the first VON demand 210. The VON provision module 115 may determine whether the abstract mapping pattern set has been analyzed. In response to the abstract mapping pattern set having been analyzed, the SDON controller 113 may output the concrete mapping pattern set.

In response to the abstract mapping pattern set not having been analyzed, the VON provision module 115 may choose a first abstract mapping pattern (e.g., MP01) from the abstract mapping pattern set. The VON provision module 115 may determine whether the virtual links 202, 204, and 206 of the first abstract mapping pattern are processed. In response to the virtual links of the first abstract mapping pattern having been processed, the VON provision module 115 may determine whether the concrete mapping pattern is complete.

In response to the virtual links 202, 204, and 206 of the first abstract mapping pattern not having been processed, the VON provision module 115 may pick a first virtual link (e.g., 202, 204, or 206) from the first abstract mapping pattern. The VON provision module 115 may remove the physical network information 123 related to one or more physical nodes 101 or one or more physical links 105 from previously processed virtual links 202, 204, and 206 of the first abstract mapping pattern. Removal of the physical network information may enforce no node crossing and/or the no link crossing constraint on the mapped VONs. The physical nodes 101 and/or the physical links 105 used by previously processed virtual links 202, 204, and 206 of the same mapping pattern may be removed so that current virtual links 202, 204, and 206 may not "cross."

The VON provision module 115 may calculate one or more slot-continuous shortest paths in the physical network 200 between end-points of the first virtual link in the physical network information 123. The slot-continuous shortest paths may be selected using a modified version of Dijkstra's single-source shortest path algorithm to store some or all paths as a search tree, pruning, and adding to this tree till the shortest path to a node is found. In some embodiments, shortest-path computations may be performed for each virtual link in each mapping pattern separately. In some embodiments, shortest path computations for several virtual links may be performed together. For example, the shortest path may be computed for several virtual links in embodiments in which the physical network information 123 is not being modified by link/node crossing constraints.

The VON provision module 115 may prune one or more slot-continuous shortest paths between end-points of the first virtual link in the physical network information 123 that have insufficient slots. The VON provision module 115 may designate a concrete path for the first virtual link. The concrete path may include a shortest-path with most continuous slots. The VON provision module 115 may add the shortest-path to the concrete mapping pattern corresponding to the first abstract mapping pattern. The VON provision module 115 may add the concrete mapping pattern to a concrete mapping pattern set. In particular, the VON provision module 115 may add the concrete mapping pattern when the concrete mapping pattern is processed and determined to be complete. In some embodiments, completion is when a physical path is designated for each of the virtual edges. The VON provision module 115 may continue the computation process until some or all of the abstract mapping patterns of some or all of the VON demands 111 have been processed.

Figure 3A:
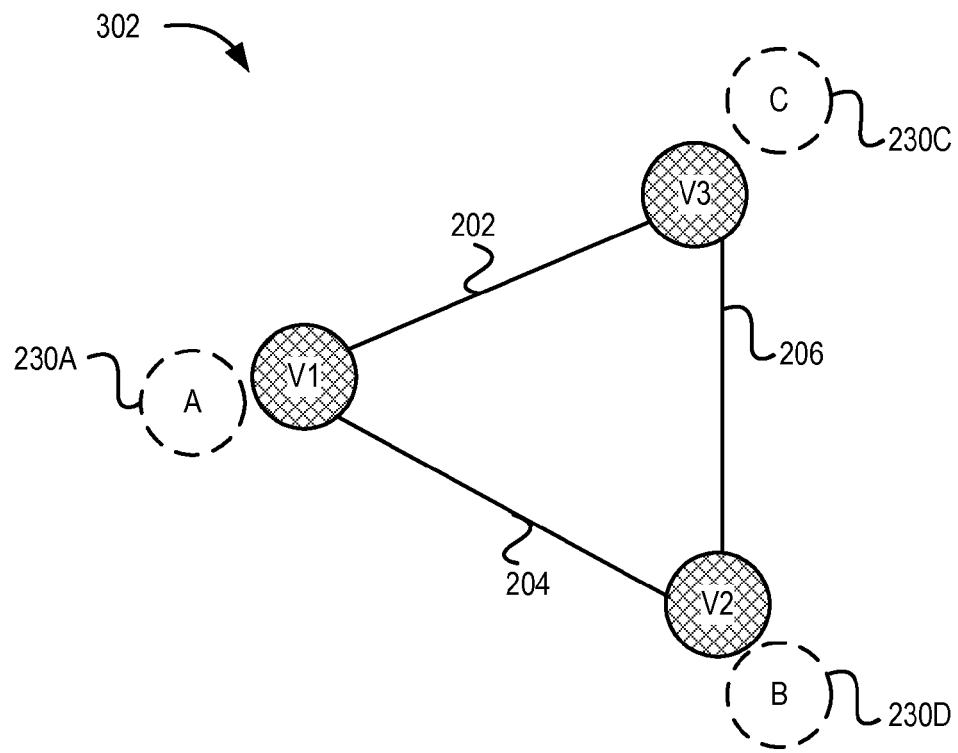
FIG. 3A illustrates an example abstract mapping pattern of the VON demand of FIG. 2B.
Figure 3B:
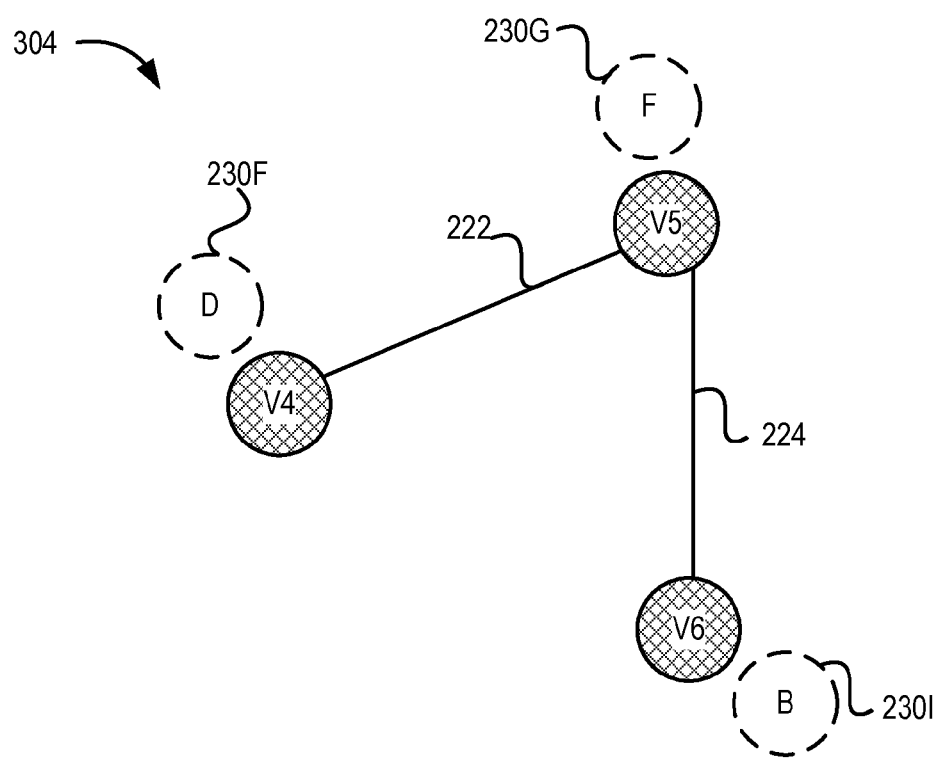
FIG. 3B illustrates another example abstract mapping pattern of the VON demand of FIG. 2C.
Figure 4:
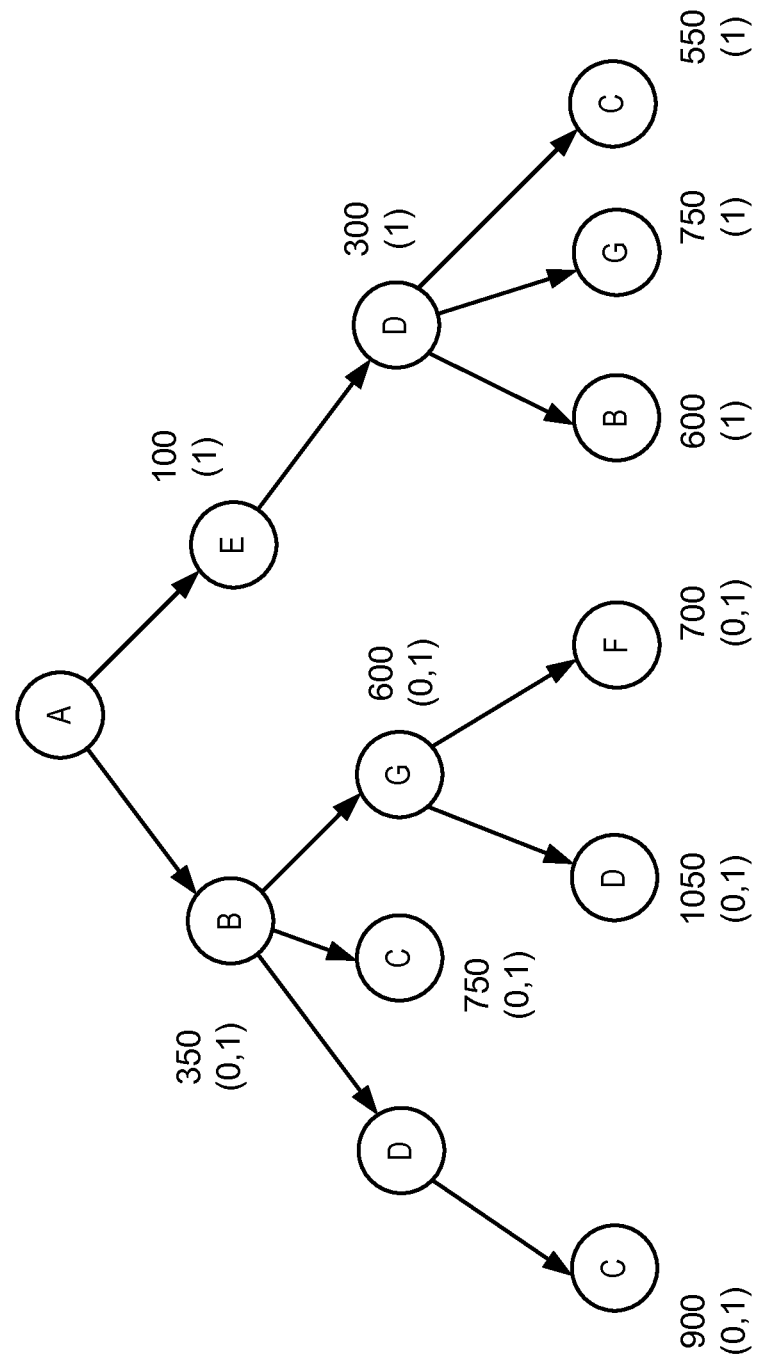
FIG. 4 depicts an example shortest path search tree.

FIGS. 3A, 3B, and 4 represent an example of feasible mapping patterns computation. FIGS. 3A, 3B, and 4 are described in conjunction with FIGS. 1A and 2A-2C. The example mapping pattern computation process is based on the physical network 200 and the VON demands 210 and 220. In the example of FIGS. 3A, 3B, and 4, slot 0 of the physical links A1 between physical node A and physical node E is blocked. Each of the other physical links B1-J1 includes two slots per link. In addition, a distance-adaption modulation is implemented such that virtual links above 400 miles use two slots and less than 400 miles use one slot.

FIG. 3A depicts a first abstract mapping pattern 302, which is included in Table 1 as MP01. FIG. 3B depicts a sixth abstract mapping pattern 304, which is included in Table 2 as MP06. Referring to FIGS. 2A and 3A, to map the first VON the virtual links 202, 204, and 206 may be mapped to paths along physical links 105 of the physical network 200.

For example, let us consider computation of a concrete mapping pattern for the abstract mapping pattern 302. The virtual link 204 may be mapped to the physical link J1. The virtual link 202 may be mapped to the physical links J1 and E1. The virtual link 206 may be mapped to E1. However, if a no-edge crossing constraints is enforced, the mapping of the virtual link 204 onto J1 may cause conflict with the mapping of the virtual link 202 onto the physical links J1 and E1. The first abstract mapping pattern 302 may have to be discarded because the virtual link 204 becomes infeasible due to exclusion of the physical link J1. The physical link J1 may be discarded from consideration, because the physical link J1 is used by virtual link 202, or vice-versa.

FIG. 4 depicts an example shortest path search tree 400. In the shortest path search tree 400 the shortest topological path from physical node A to C, the physical path A-E-D-C pruned from it because there are insufficient slots to support this virtual edge. This path is 550 miles long. Per distance adaptive modulation, a virtual edge mapped on this path would involve 2 slots. However, since slot 0 on edge A1 is blocked in this example, only one continuous slot is available along A-E-C-D, which is insufficient. Accordingly, the path including physical nodes A-B-C may be the shortest feasible path for the virtual link 202. Similar shortest path search trees may be implemented for mappings of each of the virtual links.

Referring to FIG. 3B, mapping of the virtual link 222 may be computed as the path through the physical nodes D-G-F of FIG. 2A. The mapping of the virtual link 224 may include a path through the physical nodes F-C-B or through the physical nodes F-G-B. In embodiments in which a no-node crossing constraint is implemented, the path through the physical nodes F-C-B may be used to avoid conflict with the path through the physical nodes D-G-F. In embodiments in which the no-node crossing constraint is not implemented, the path though the physical nodes F-G-B may be used because it is shorter.

Maximum Provisionable Subset

To determine a maximum size of a provisional subset of a subgroup of the VONs, an iterative provisionable test process may be implemented. In general, in the iterative provisionable test process, a size of a subset is varied between various parameters and it is repeatedly determined whether a subset of the VONs of a particular size is provisionable. If the subset of the particular size is provisionable, a subset of a larger size is then tested. If the subset of the particular size is not provisionable, then size is reduced. The iterative provisionable test process is continued until the maximum size is found. A binary search process may be used to organize the iterative search to for a maximum size of a provisional subset of a subgroup of the VONs.

In an example embodiment, to find a size of a maximum provisionable subset, the VON provision module 115 may read the physical network information 123 and the VON demands 111. The VON provision module 115 may initialize a max value parameter to be an absolute value of a number of the VON demands. The VON provision module 115 may further initialize a min value parameter to be one. The VON provision module 115 may further initialize a maximum provisionable size parameter to be zero. The VON provision module 115 may determine whether all the VON demands are simultaneously provisionable. Some additional details of the determination of whether the VON demands are provisionable are provided below.

In response to all the VON demands not being simultaneously provisionable, the VON provision module 115 may determine whether the max value parameter is greater than or equal to the min value parameter. In response to the max value parameter being less than the min value parameter, the VON provision module 115 may output the maximum provisionable size parameter.

In response to the max value parameter being greater than or equal to the min value parameter, the VON provision module 115 may set a mid value parameter equal to a sum of the min value parameter and a floor function applied to half of the difference of the max value parameter and the min value parameter. The VON provision module 115 may determine whether a subset of the set of the VON demands of a size of the mid value parameter or greater is provisionable. In response to a subset of the set of the VON demands of the size of the mid value parameter or greater being provisionable, the VON provision module 115 may update the maximum provisionable size parameter to be a greater of the mid value parameter and the current value of the maximum provisionable size parameter. The VON provision module 115 may set the min value parameter to a sum of one and the mid value parameter. In response to a subset of the set of the VON demands of the size of the mid value parameter or greater not being provisionable, the VON provision module 115 may set the max value parameter to a difference of the mid value parameter and one.

Provisionable Determination

The process of finding the maximum subset size may include one or more determinations as to whether VONs or subsets thereof are provisionable. For example, in some embodiments, it may be determined whether all VONs in a subgroup are provisionable and it may be determined whether a subset of the subgroup of a particular size is provisionable. Making a provisionable determination may return an output of a true or a false.

To make the provisionable determination, a feasible mapping function may be implemented. In U.S. application Ser. No. 14/619,032, an example of the feasible mapping function is described. As implemented herein, the feasible mapping function may be configured to receive as inputs the physical network information 123 and the VON demands 111 and return a mapped solution. The mapped solution output by the feasible mapping function meets a mapping pattern selection constraint, a link capacity constraint, a solution quality constraint, a size of mapped subset constraint, and a blocked mapping solution constraint.

The mapping pattern selection constraint may dictate that each mapped VON is realized according to one of the (concrete) mapping patterns, where a concrete mapping pattern is an abstract mapping pattern (e.g., one of the mapping patterns of Tables 1 or 2) that has been suitably concretized according to the concrete mapping pattern computation procedure discussed above and with reference to FIGS. 7A and 7B. The link capacity constraint may dictate that link capacity of the physical network 200 is complied with (e.g., a number of slots per physical link 105 is not exceeded). The solution quality constraint may dictate that a mapped solution includes a particular number or less of the physical slots. The size of mapped subset constraint may dictate that the mapped solution includes some particular number of VONs or particular size of a subset of VONs. The blocked mapping solution constraint may dictate that the mapped solution does not include blocked mapping solutions, which may previously have been determined to be infeasible or otherwise unavailable. The mapping pattern selection constraint, the link capacity constraint, and the solution quality constraint are discussed in U.S. application Ser. No. 14/619,032.

The link capacity constraint may be generalized according to link capacity expressions:

$$a1 + a2 <= 2;$$

$$b1 + b2 <= 2;$$

$$\ldots$$

$$j1 + j2 <= 2; \text{ and}$$

$$\text{all } a1 - j1 \text{ and } a2 - j2 >= 0.$$

In the link capacity expressions, a1 represents an integer variable indicating the number of slots of a selected physical link A1 of the physical network 200 that are used in the mapping solution for the first VON 103A. The parameter a2 represents an integer variable parameter indicating the number of slots of a selected physical link A1 of the physical network 200 that are used in the mapping solution of the second VON 103B. Similar conventions are followed for a1-j1 and a2-j2. The "2" represents the link capacity of a particular physical link. Accordingly, the link capacity is maintained because a1+a2=<2.

The solution quality constraint may be generalized according to a solution quality expression:

$$a1+b1+\ldots j1+a2+b2+\ldots j2 <= q.$$

In the solution quality expression, a1-j1 and a2-j2 are as described above. The parameter q represents a slot number parameter that represents a certain number of slots of the physical network 200. Accordingly, this constraint specifies that the total number of slots used by the mapping solution may not exceed the specified parameter q of slots of the physical network.

The size of mapped subset constraint may be represented by the size of mapped subset constraint expressions:

$$VONs = \{VON_1, VON_2 \ldots VON_{k-1}, VON_k\}$$

$$\text{for } i = 1:k:$$

$$(mp_i^1 \vee mp_i^2 \vee \ldots \vee mp_i^j) \leftrightarrow (s_i = 1)$$

$$\text{end}$$

$$\sum_{i=1}^{k} s_i \geq d$$

In the mapped constraint expressions VONs represents a set of VONs that includes $VON_1, VON_2 \ldots VON_{k-1}$, and $VON_k$. The integer k represents a number of VONs in the set of VONs. The parameter i represents a counting variable referring to a particular VON. The parameter $mp_i^j$ represents the mapping pattern selection constraint corresponding to the jth mapping pattern for $VON_i$. The parameter $s_i$ represents an integer parameter indicative of whether $VON_i$ is successfully mapped in the computed mapping solution. The parameter $s_i$ may equal '1' if and only if $VON_i$ is mapped and may equal '0' if $VON_i$ is not mapped. The parameter d represents a size or a number of VONs to be successfully mapped. The operator $\vee$ represents an 'or' operator.

An example of the size of mapped subset constraint may be illustrated by FIGS. 1A and 2A-3B. In the current example, each of the physical links 105 includes four slots and slots 0 and 1 of the physical links J1 and F1 are blocked. Further, candidate physical node B is excluded from the set of candidate physical nodes of virtual nodes V-6 in the second VON 103B from the second VON demand 220. Thus V-6 now has only one candidate physical node, A. In this example, the second VON 103B from the second VON demand 220 in all possible mapping configurations includes two slots on the physical link J1. In addition, the first VON 103A from the first VON demand 210 in some or all possible mapping configurations includes at least one slot along the physical link J1. Accordingly, the maximum size of mapped subset (e.g., represented through the parameter 'd' from the mapped constraint expressions) may equal at most 1 because only one of the first VON 103A and the second VON 103B may be mapped.

The blocked mapping solution constraint may be represented by blocking set constraint expressions:

$$I = I_1 \wedge I_2 \wedge \ldots \wedge I_b;$$

$$a1=1; a2=0; b1=0; b2=0; \ldots j1=1; j2=1 \text{ (as selected); and}$$

$$I_x = (a1!=1) \vee (a2!=0) \vee (b1!=0) \vee (b2!=0) \ldots \vee (j1!=1) \vee (j2!=0).$$

In the blocking set constraint, $\vee$, a1-j1 and a2-j2 are as described above. I represents a blocking constraint set that includes $I_1, I_2 \ldots I_b$ in that each represent a blocking constraint for one mapping solution. $I_x$ is one of the blocking constraints. The operator $\wedge$ represents an and operator. The blocking constraint prevents use of specific combinations of physical links 105 by subsequent VON mapping solutions being explored.

In some embodiments, the feasible mapping function may be represented by a feasible mapping expression:

$$m = \text{mapVON}(n, V, d, q, I)$$

In the feasible mapping expression, m represents the mapped solution. The function mapVON represents the feasible mapping function. The parameter n represents the physical network information 123. The parameter V represents the VON demands 111. The parameter d represents the minimum size of the subset of VONs out of the set of VONs 111 that the mapped solution m is required to successfully map. The parameter q represents a slot number parameter that represents a maximum number of slots of the physical network 200 that a computed mapping solution 109 is allowed to use. The parameter I represents the blocked constraint set. The parameters n, V, d, q, I are as described elsewhere in this disclosure.

In addition to the feasible mapping function, the provisionable determination may involve a slot assignment function. The slot assignment function may be substantially similar to that described in U.S. application Ser. No. 14/619,029.

In some embodiments, the slot assignment function may be represented by a slot assignment expression:

$$a = \text{slotAssign}(n, V, m, c).$$

In the slot assignment expression, n, V, and m are as described above. The parameter a represents a slot assignment solution and c represents the maximum cost value that the computed slot assignment solution 'a' is allowed to have.

Accordingly, in an example embodiment, to determine whether the set of the VON demands of the size is provisionable, the VON provision module 115 may read the physical network information 123, the VON demands 111, and the size (represented above as parameter 'd'). The VON provision module 115 may initialize a counter parameter to zero and a blocked constraint set to null.

The VON provision module 115 may determine whether the counter parameter is less than a max block count parameter. In response to the counter parameter being greater than or equal to the max block count parameter, the VON provision module 115 may return a FALSE output.

In response to the counter parameter being less than the max block count parameter, the VON provision module 115 may determine whether there is a feasible mapping for the feasible mapping function. In some embodiments, the feasible mapping may be returned from application of the mapVON function applied to the physical network information 123, the VON demands 111, the slot number parameter, and the blocked constraint set. In response to there not being the feasible mapping, the VON provision module 115 may return a FALSE output.

In response to there being the feasible mapping, the VON provision module 115 may determine whether there is a feasible slot assignment for a slot assignment function, with an INFINITE value specified for the cost parameter 'q'. In some embodiments, the slot assignment function may include a slotAssign function applied to the physical network information 123, the VON demands 111, the feasible mapping, and a cost bound for the slot assignment specified as INFINITE. In response to there not being a feasible slot assignment, the VON provision module 115 may add the feasible mapping to a set of blocked mappings and increment (e.g., add a one) the counter parameter.

Figure 5:
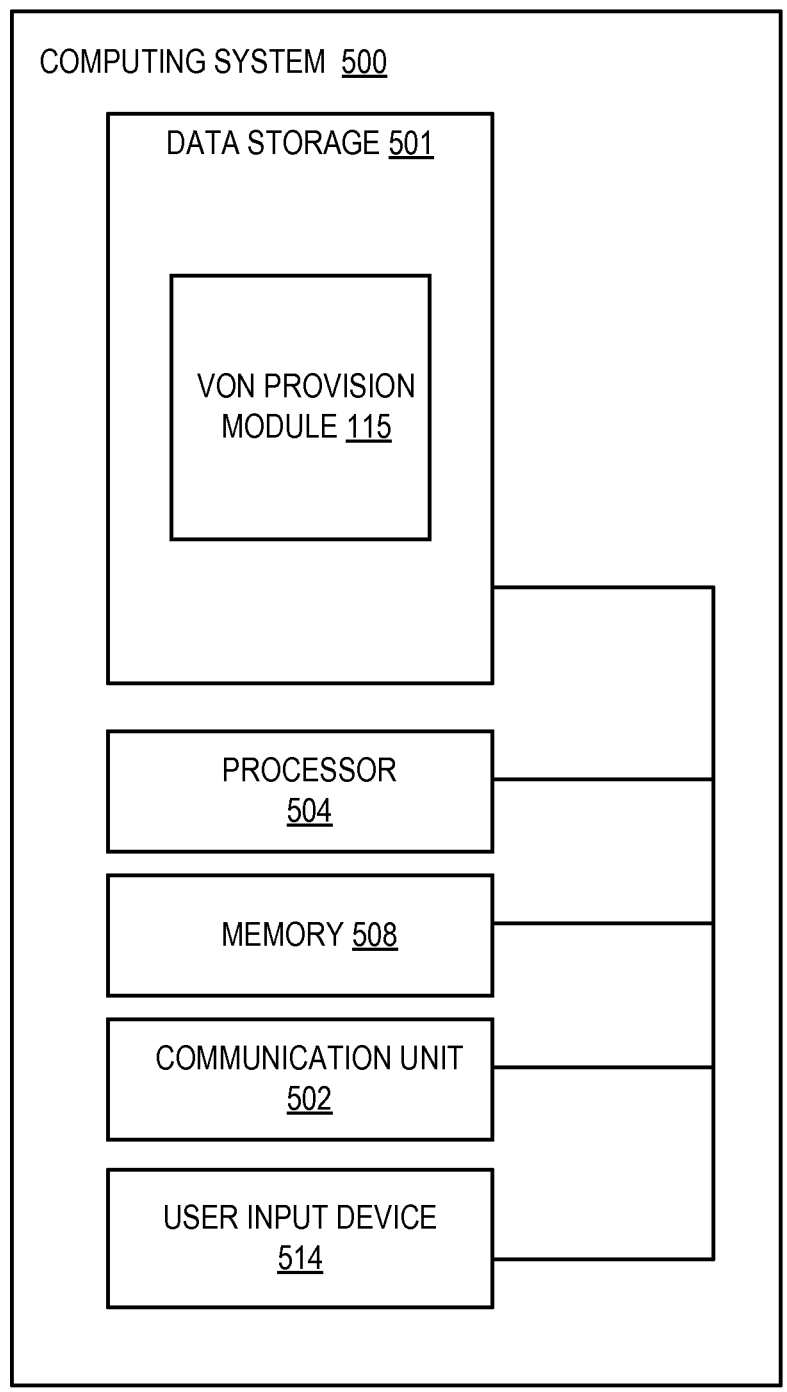
FIG. 5 illustrates an example computing system configured of a VON demand provisioning process.

FIG. 5 illustrates an example computing system 500 configured to a VON demand provisioning process. The computing system 500 may be implemented in the operating environment 50 of FIG. 1A. Examples of the computing system 500 may include one or more of the SDON controller 113 and/or the physical nodes 101/A-G. The computing system 500 may include one or more processors 504, a memory 508, a communication unit 502, a user input device 514, and a data storage 501 that further includes the VON provision module 115.

The processor 504 may include any suitable special-purpose or general-purpose computer, computing entity, or processing device including various computer hardware or software modules and may be configured to execute instructions stored on any applicable computer-readable storage media. For example, the processor 504 may include a microprocessor, a microcontroller, a digital signal processor (DSP), an ASIC, a FPGA, or any other digital or analog circuitry configured to interpret and/or to execute program instructions and/or to process data.

Although illustrated as a single processor in FIG. 5, the processor 504 may more generally include any number of processors configured to perform individually or collectively any number of operations described in the present disclosure. Additionally, one or more of the processors 504 may be present on one or more different electronic devices or computing systems. In some embodiments, the processor 504 may interpret and/or execute program instructions and/or process data stored in the memory 508, the data storage 501, or the memory 508 and the data storage 501. In some embodiments, the processor 504 may fetch program instructions from the data storage 501 and load the program instructions in the memory 508. After the program instructions are loaded into the memory 508, the processor 504 may execute the program instructions.

The memory 508 and the data storage 501 may include computer-readable storage media for carrying or having computer-executable instructions or data structures stored thereon. Such computer-readable storage media may include any available media that may be accessed by a general-purpose or special-purpose computer, such as the processor 504. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 504 to perform a certain operation or group of operations.

The communication unit 502 may include one or more pieces of hardware configured to receive and send communications. In some embodiments, the communication unit 502 may include one or more of an antenna, a wired port, and modulation/demodulation hardware, among other communication hardware devices. In particular, the communication unit 502 may be configured to receive a communication from outside the computing system 500 and to present the communication to the processor 504 or to send a communication from the processor 504 to another device or network.

The user input device 514 may include one or more pieces of hardware configured to receive input from and/or provide output to a user. In some embodiments, the user input device 514 may include one or more of a speaker, a microphone, a display, a keyboard, and a touch screen, a holographic projection, among other hardware devices. In these and other embodiments, the user input device 514 may be configured to receive input from a user of the computing system 500.

The VON provision module 115 may include program instructions stored in the data storage 501. The processor 504 may be configured to load the VON provision module 115 into the memory 508 and execute the VON provision module 115. Alternatively, the processor 504 may execute the VON provision module 115 line-by-line from the data storage 501 without loading them into the memory 508. When executing the VON provision module 115, the processor 504 may be configured for performance of the VON demand provisioning process as described elsewhere herein.

Modifications, additions, or omissions may be made to the computing system 500 without departing from the scope of the present disclosure. For example, in some embodiments, the computing system 500 may not include the user input device 514. In some embodiments, the different components of the computing system 500 may be physically separate and may be communicatively coupled via any suitable mechanism. For example, the data storage 501 may be part of a storage device that is separate from a server, which includes the processor 504, the memory 508, and the communication unit 502, that is communicatively coupled to the storage device.

Figure 6A:
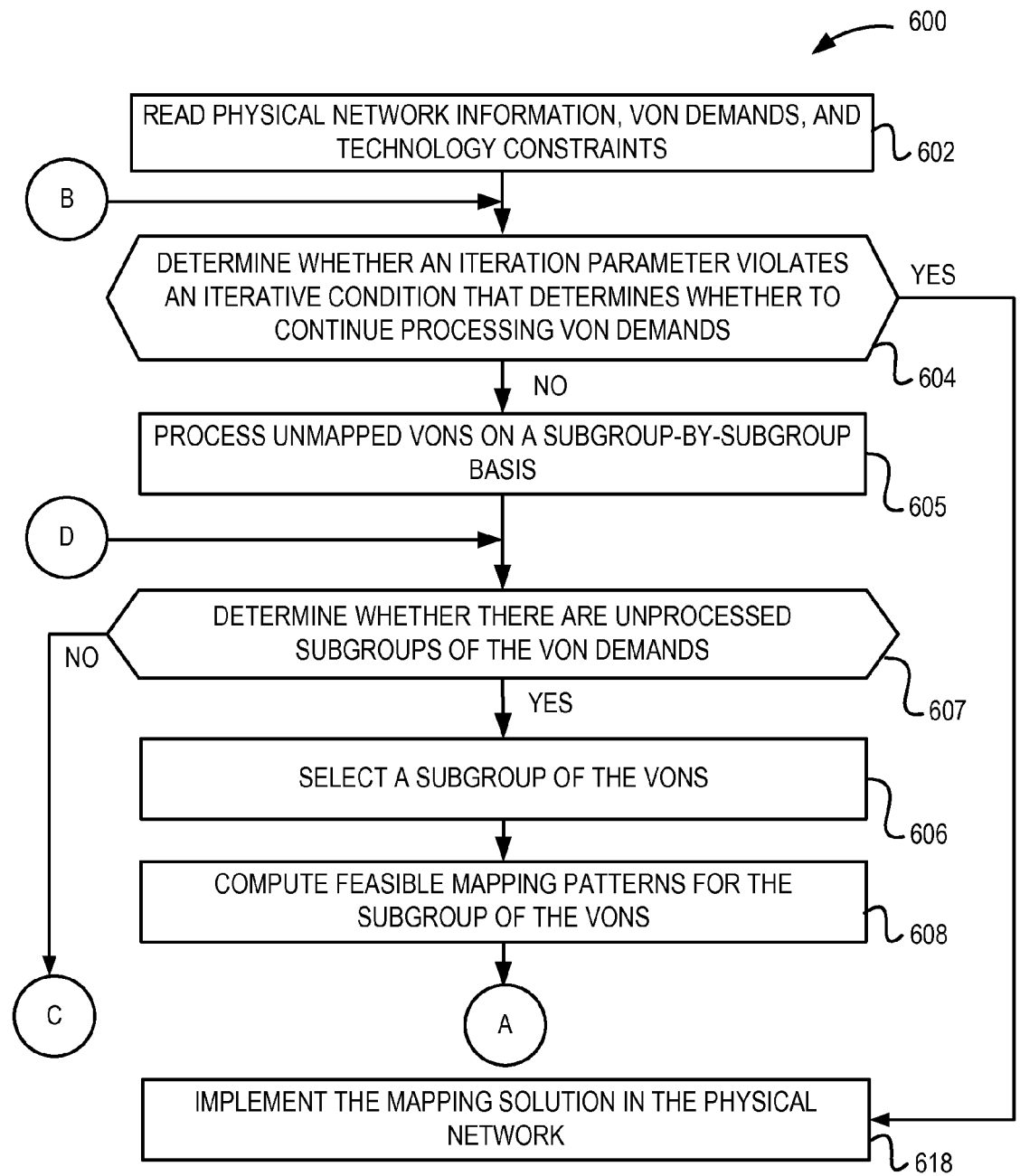
FIGS. 6A and 6B are a flow diagram of an example method of mapping VONs to a physical network.
Figure 6B:
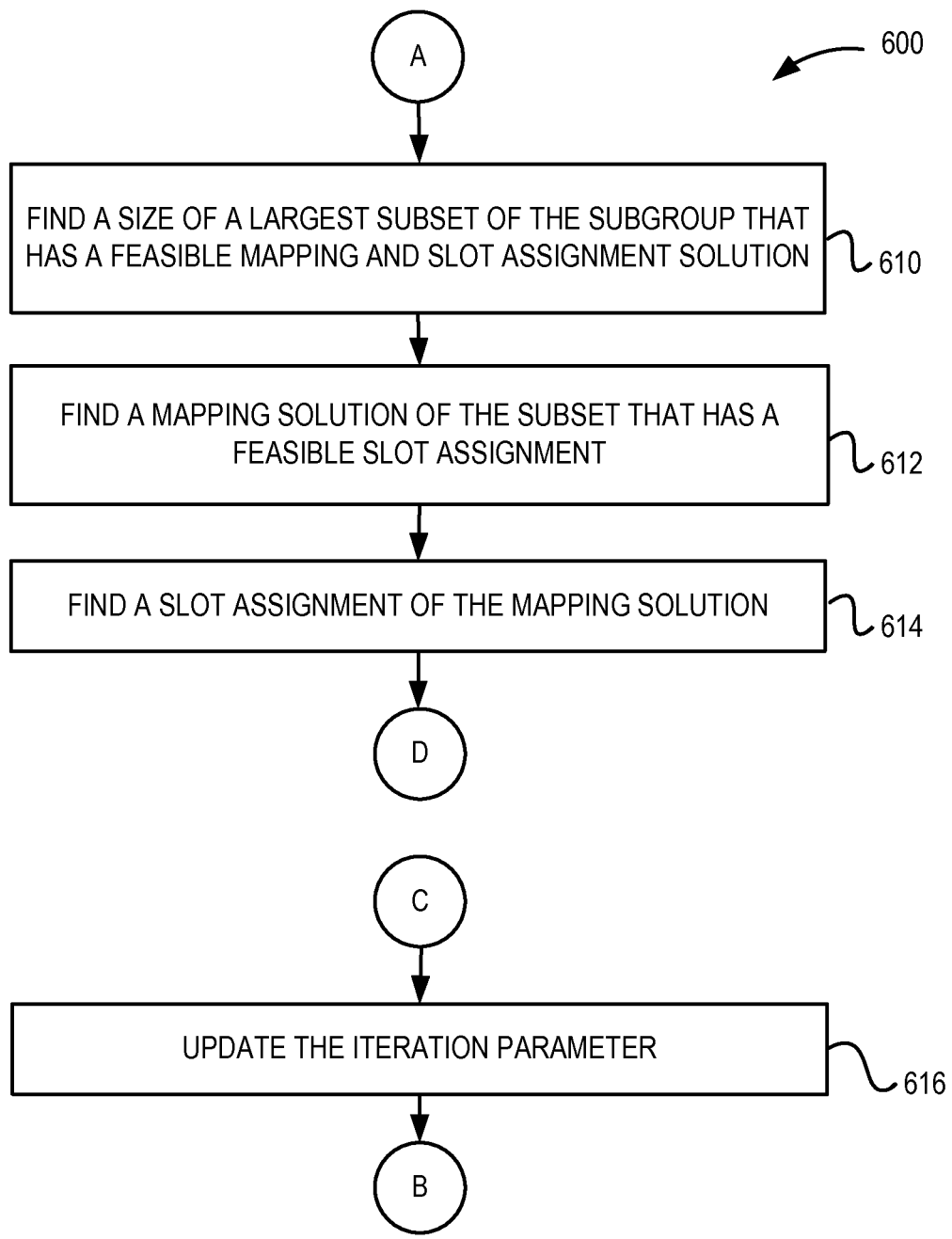

FIGS. 6A and 6B are a flow diagram of an example method 600 of mapping VONs to a physical network, arranged in accordance with at least one embodiment described herein. Although illustrated as discrete blocks, various blocks may be divided into additional blocks, combined into fewer blocks, or eliminated, depending on the desired implementation.

The method 600 may begin at block 602 in which physical network information, VON demands, and technology constraints are read. At block 604, it may be determined whether an iteration parameter violates an iterative condition. The iterative condition may determines whether to continue processing the VON demands.

In response to the iteration parameter violating the iterative condition ("YES" at block 604), the method 600 may proceed to block 618. In response to the iteration parameter not violating the iterative condition ("NO" at block 604), the method 600 may proceed to block 605. At block 605, unmapped VONs may be processed on a subgroup-by-subgroup basis. At block 607, it may be determined whether there are unprocessed subgroups of the VON demands. In response to there being one or more unprocessed subgroups ("YES" at block 607), the method 600 may proceed to block 606. In response to there not being one or more unprocessed subgroups ("NO" at block 607), the method 600 may proceed to block 616 of FIG. 6B. At block 606, a subgroup of the VONs may be selected. At block 608, feasible mapping patterns may be computed for the subgroup of the VONs. In some embodiments, the block 608 may include one or more blocks of method 700 discussed below.

With reference to FIG. 6B, at block 610, a size of a largest subset of the subgroup may be found. The largest subset may include a feasible mapping and slot assignment solution. In some embodiments, block 610 may include one or more blocks of methods 800 and/or 900. At block 612, a mapping solution may be found of the subset. The mapping solution may include a feasible slot assignment. At block 614, a slot assignment of the mapping solution may be found. From block 614, the method 600 may proceed to block 607 and through one or more of blocks 604, 605, 607, 606, 608, 618, 610, 612, 614, and 616.

At block 616, the iteration parameter may be updated. The iteration parameter may be updated to reflect status of the mapping as per a latest iteration of VON processing. From block 616, the method 600 may proceed to block 604. The method 600 may further proceed through one or more of the blocks 604, 605, 607, 606, 608, 618, 610, 612, 614, and 616. At block 618, the mapping solution may be implemented in the physical network. Implementation may include configuring the physical nodes and/or the physical links according to at least a portion of the VON demands.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 7A:
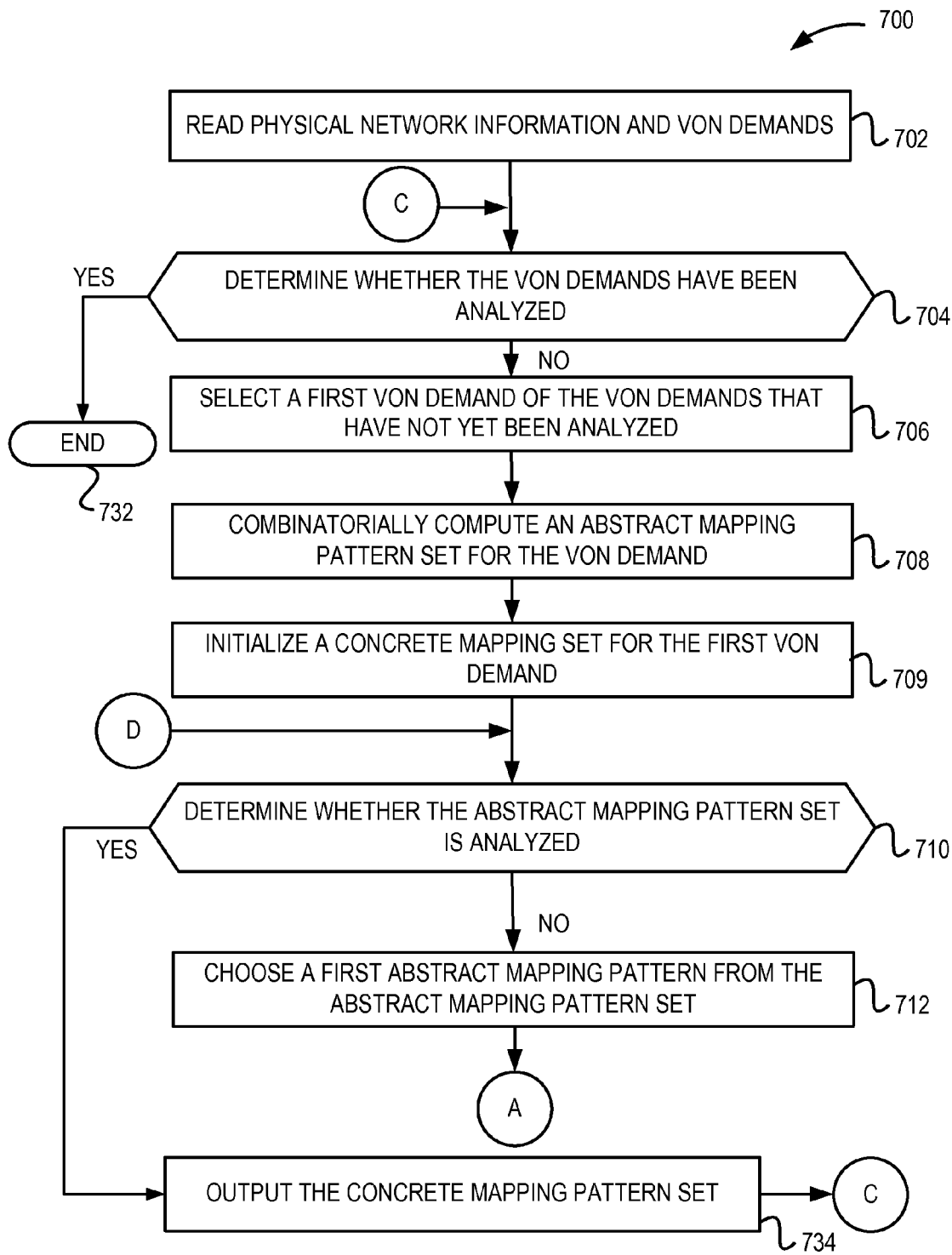
FIGS. 7A and 7B are a flow diagram of an example method of computing feasible mapping patterns.
Figure 7B:
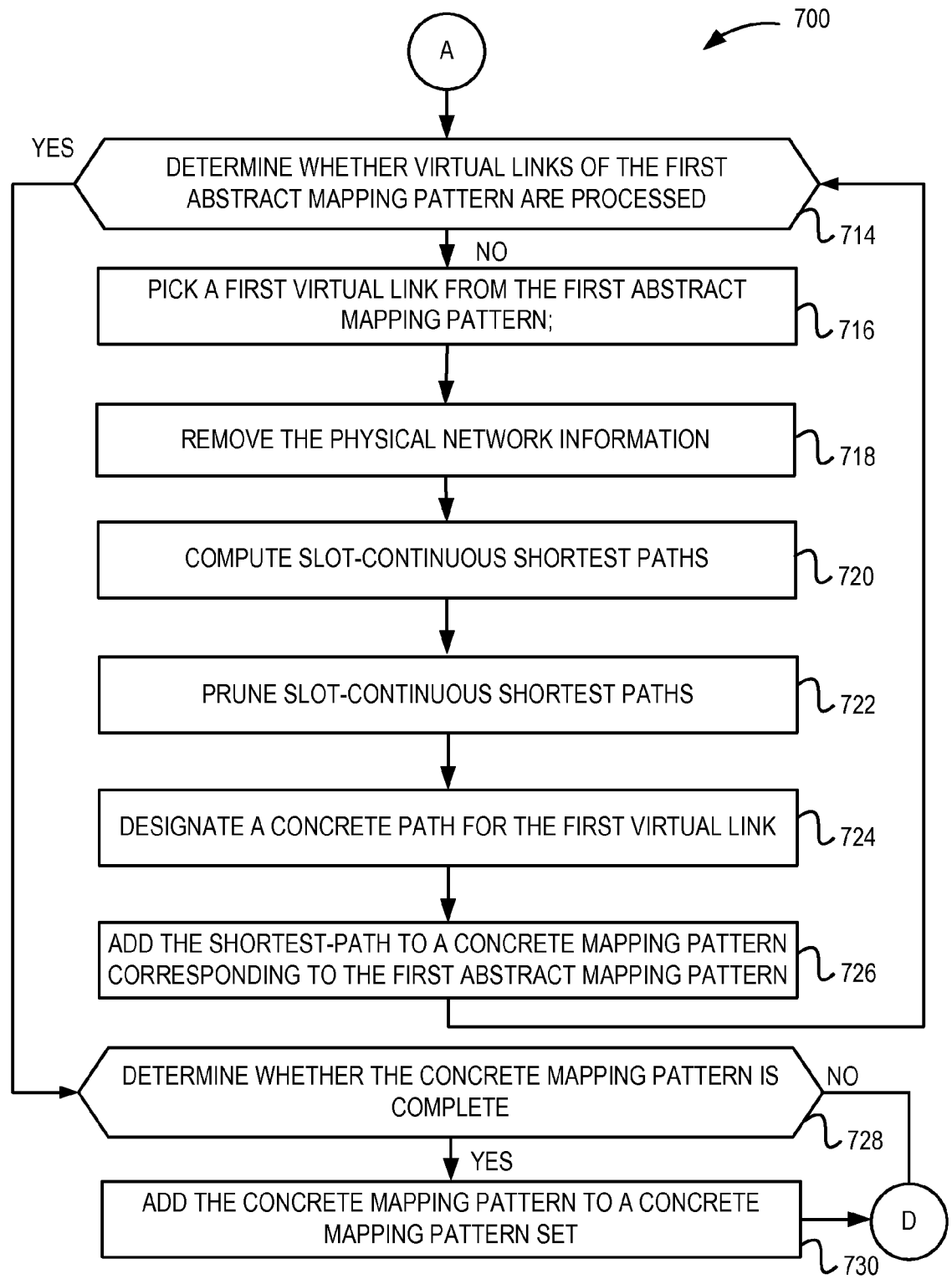

FIGS. 7A and 7B are a flow diagram of an example method 700 of computing feasible mapping patterns, arranged in accordance with at least one embodiment described herein. Although illustrated as discrete blocks, various blocks may be divided into additional blocks, combined into fewer blocks, or eliminated, depending on the desired implementation.

With reference to FIG. 7A, the method 700 may begin at block 702 in which physical network information and VON demands are read. At block 704, it may be determined whether the VON demands have been analyzed. In response to the VON demands being analyzed ("YES" at block 704), the method 700 may proceed to block 732 in which the method 700 ends. In response to the VON demands not being analyzed ("NO" at block 704), the method may proceed to block 706. At block 706 a first VON demand of the VON demands may be selected. The first VON demand that is selected may not yet have been analyzed. At block 708, an abstract mapping pattern set may be combinatorially computed for the VON demand. At block 709, a concrete mapping set may be initialized for the first VON demand.

At block 710, it may be determined whether the abstract mapping pattern set is analyzed. In response to the abstract mapping pattern set being analyzed ("YES" at block 710), the method 700 may proceed to block 734. In response to the abstract mapping pattern set not being analyzed ("NO" at block 710), the method 700 may proceed to block 712. At block 712, a first abstract mapping pattern may be chosen from the abstract mapping pattern set. From block 712, the method 700 may proceed to block 714 of FIG. 7B. At block 734, the concrete mapping pattern set may be output and the method 700 may proceed to block 704. The method 700 may proceed through one or more of blocks 704, 706, 708, 709, 710, 712, 732, 734, 714, 716, 718, 720, 722, 724, 726, 728, and 730.

With reference to FIG. 7B, at block 714, it may be determined whether virtual links of the first abstract mapping pattern are processed. In response to the virtual links of the first abstract mapping pattern not being processed ("NO" at block 714), the method 700 may proceed to block 716. In response to the virtual links of the first abstract mapping pattern being processed ("YES" at block 714), the method 700 may proceed to block 728.

At block 716 a first virtual link may be picked from the first abstract mapping pattern. At block 718, the physical network information may be removed. For example, the physical network information related to one or more nodes or one or more links from of previously mapped virtual links of the first abstract mapping pattern. At block 720, slot-continuous shortest paths may be computed. The slot-continuous shortest paths may be computed between end-points of the first virtual link in the physical network information.

At block 722, slot-continuous shortest paths may be pruned between end-points of the first virtual link in the physical network information that have insufficient slots. At block 724, a concrete path may be designated for the first virtual path. For example, the concrete path may include a shortest-path with most continuous slots. At block 726, the shortest-path may be added to a concrete mapping pattern corresponding to the first abstract mapping pattern. The method 700 may proceed from block 726 to block 714. The method 700 may then proceed through one or more of blocks 704, 706, 708, 709, 710, 712, 732, 734, 714, 716, 718, 720, 722, 724, 726, 728, and 730.

At block 728, it may be determined whether the concrete mapping pattern is complete. In response to the concrete mapping pattern being complete ("YES" at block 728), the method 700 may proceed to block 730. In response to the concrete mapping pattern not being complete ("NO" at block 728), the method 700 may proceed to block 710. At block 730, the concrete mapping pattern may be added to a concrete mapping pattern set. The method 700 may proceed from block 730 to block 710. The method 700 may then proceed through one or more of blocks 704, 706, 708, 709, 710, 712, 732, 734, 714, 716, 718, 720, 722, 724, 726, 728, and 730.

In some embodiments, one or more of the blocks described with reference to FIGS. 7A and 7B may be implemented in another of the methods 600. For example, one or more of the blocks described with reference to FIGS. 7A and 7B may be included in block 608 of the method 600.

Figure 8A:
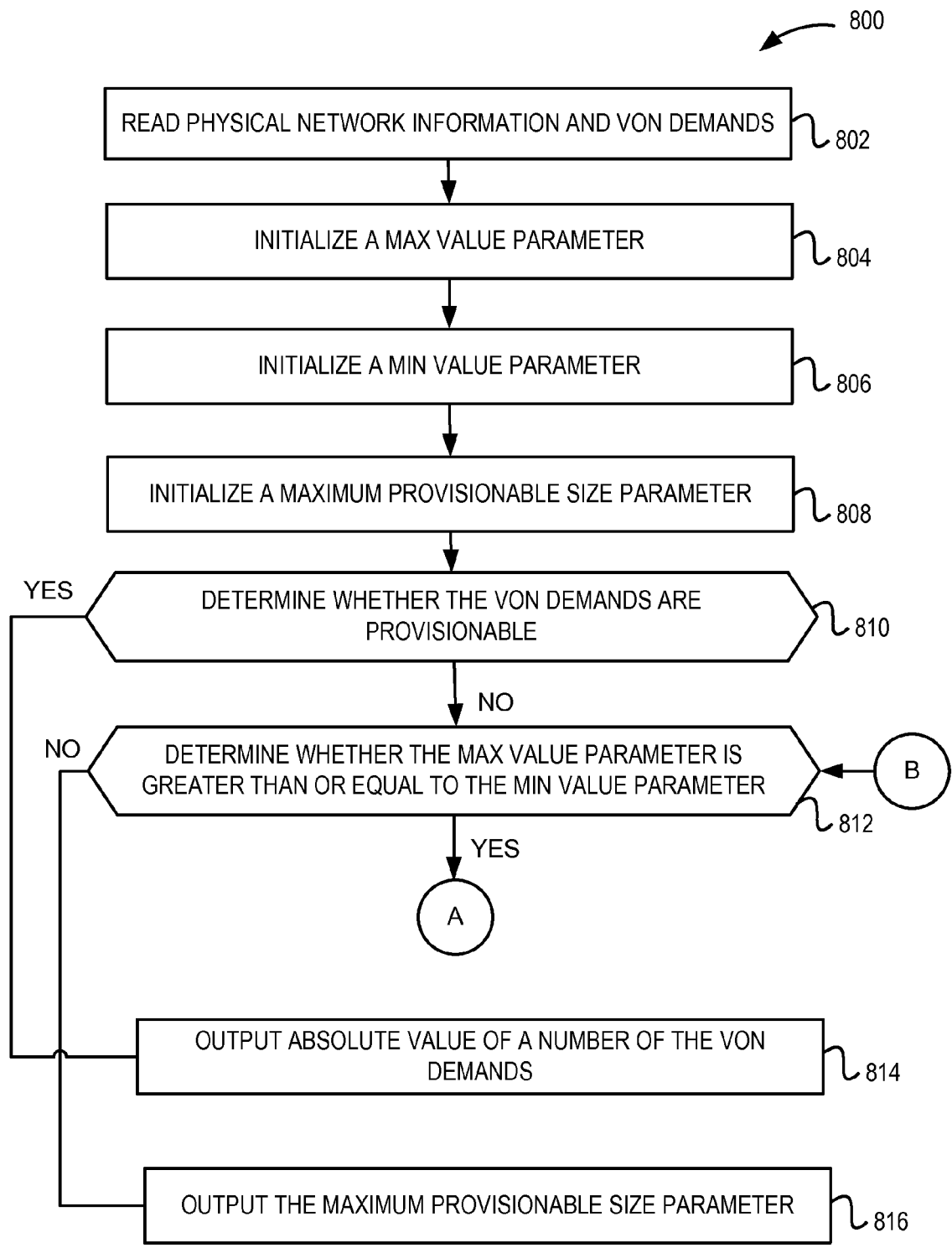
FIGS. 8A and 8B are a flow diagram of an example method of finding a size of a largest subset of a subgroup.
Figure 8B:
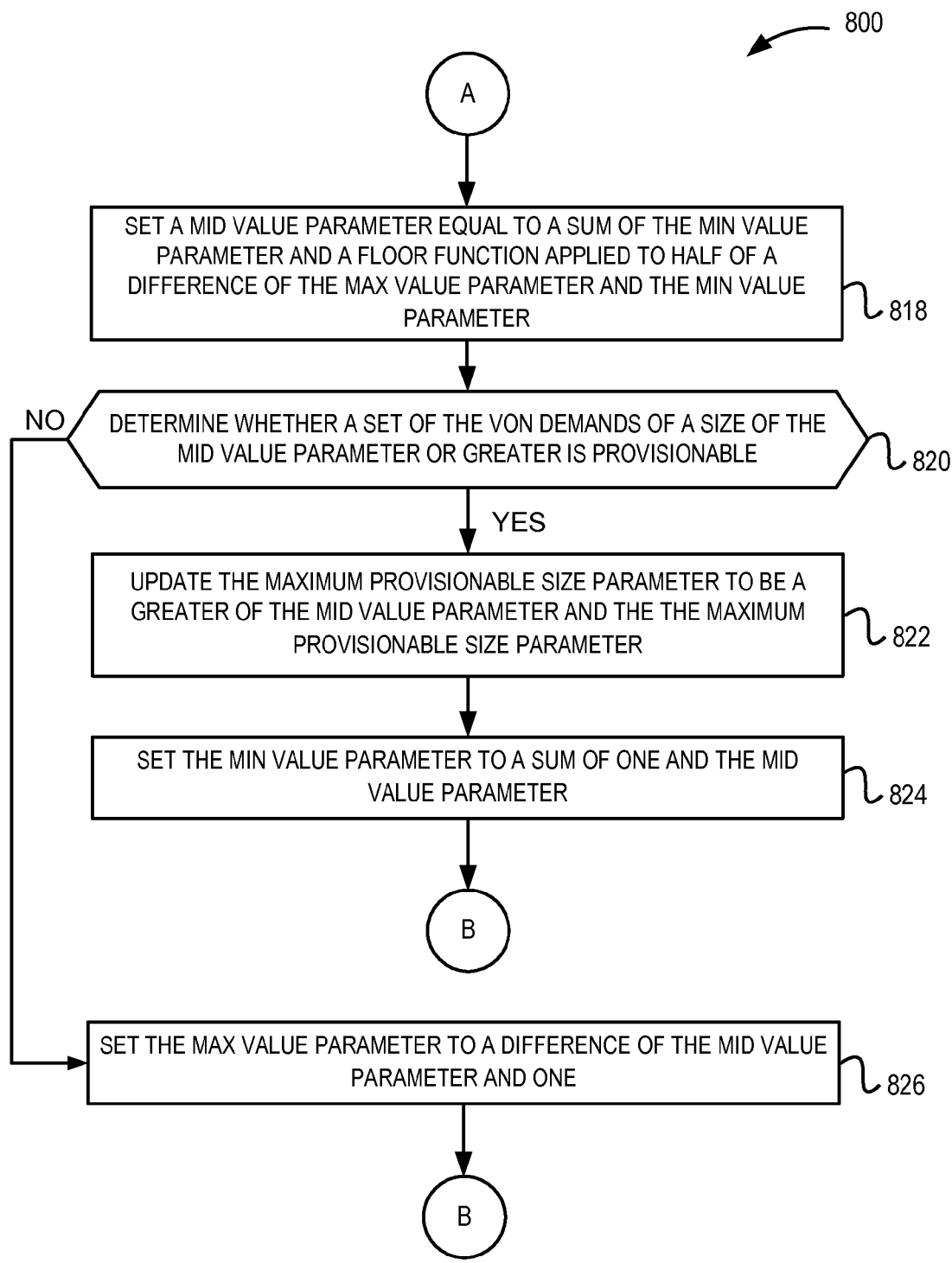

FIGS. 8A and 8B are a flow diagram of an example method 800 of finding a size of a largest subset of a subgroup that has a feasible mapping and slot assignment solution, arranged in accordance with at least one embodiment described herein. Although illustrated as discrete blocks, various blocks may be divided into additional blocks, combined into fewer blocks, or eliminated, depending on the desired implementation.

With reference to FIG. 8A, the method 800 may begin at block 802 in which physical network information and VON demands are read. At block 804, a max value parameter may be initialized. The max value parameter may be initialized to be an absolute value of a number of the VON demands. At block 806, a min value parameter may be initialized. The min value parameter may be initialized to be one. At block

808, a maximum provisionable size parameter may be initialized. The maximum provisionable size parameter may be initialized to be zero.

At block 810, it may be determined whether the VON demands are provisionable. In response to the VON demands not being provisionable ("NO" at block 810), the method 800 may proceed to 812. In response to the VON demands being provisionable ("YES" at block 810), the method 800 may proceed to block 814. At block 814, the absolute value of the number of VON demands may be output.

At block 812, it may be determined whether the max value parameter is greater than or equal to the min value parameter. In response to the max value parameter being less than the min value parameter ("NO" at block 812), the method 800 may proceed to block 816. At block 816, the maximum provisionable size parameter may be output. In response to the max value parameter being greater than or equal to the min value parameter ("YES" at block 812), the method 800 may proceed to block 818 of FIG. 8B.

With reference to block FIG. 8B, at block 818 a mid value parameter may be set equal to a sum of the min value parameter and a floor function applied to half of a difference of the max value parameter and the min value parameter. At block 820, it may be determined whether a set of the VON demands of a size of the mid value parameter or greater is provisionable. In response to the set of the VON demands of the size of the mid value parameter or greater not being provisionable ("NO" at block 820), the method 800 may proceed to block 826. At block 826, the max value parameter may be set to a difference of the mid value parameter and one.

In response to the set of the VON demands of the size of the mid value parameter or greater being provisionable ("YES" at block 820), the method 800 may proceed to block 822. At block 822, the maximum provisionable size parameter may be updated to be a greater of the mid value parameter and the maximum provisionable size parameter. At block 824, the min value parameter may be set to a sum of one and the mid value parameter. The method 800 may proceed from blocks 824 and/or 826 to block 812 of FIG. 8A. The method 800 may then proceed through one or more of blocks 812, 818, 820, 822, 824, 826, and 816.

In some embodiments, one or more of the blocks described with reference to FIGS. 8A and 8B may be implemented in another of the methods 600 and 700. For example, one or more of the blocks described with reference to FIGS. 8A and 8B may be included in block 610 of the method 600.

Figure 9:
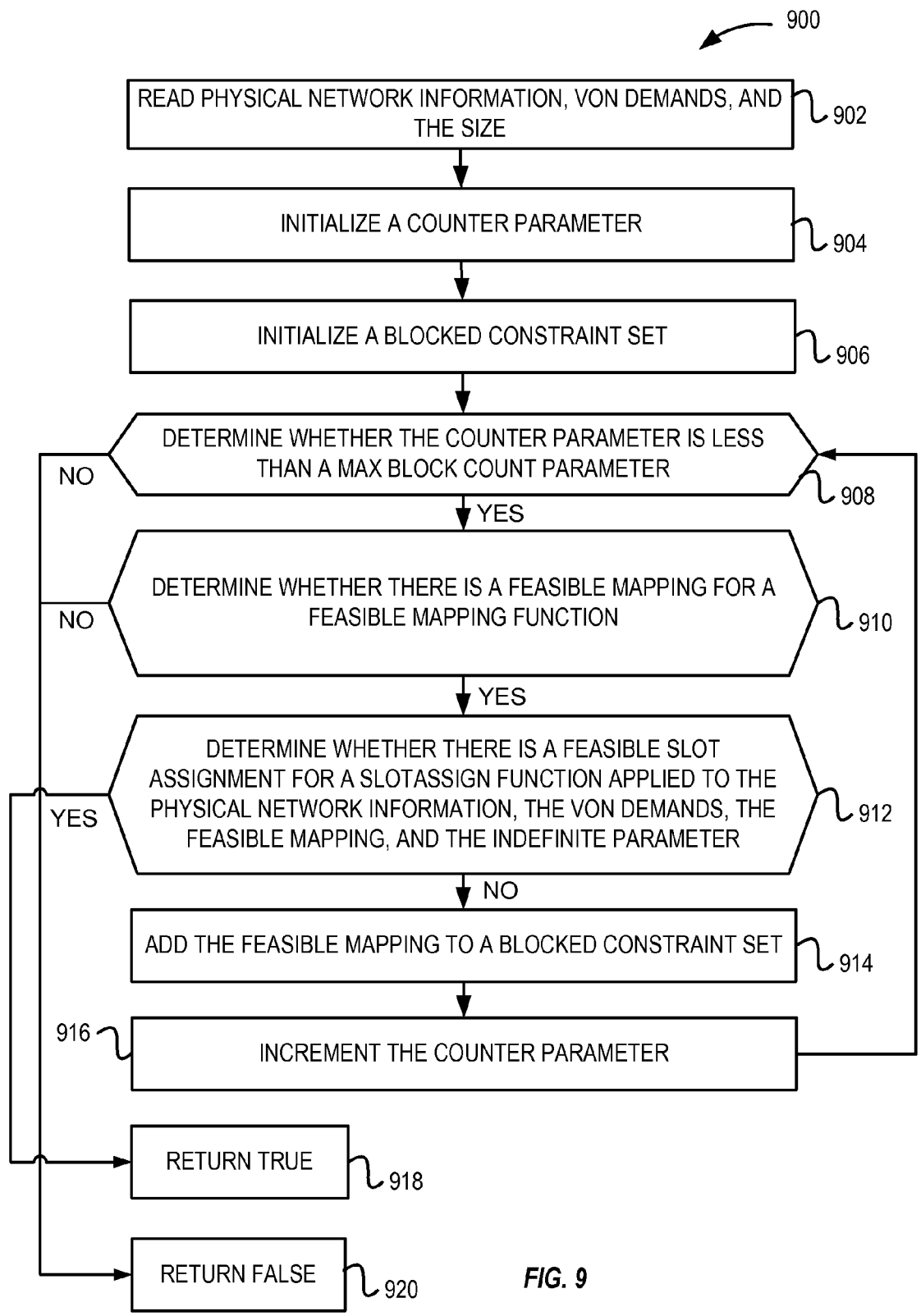
FIG. 9 is a flow diagram of an example method of determining whether a set of the VON demands of a size is provisionable, all in accordance with at least one embodiment described herein.

FIG. 9 is a flow diagram of an example method 900 of determining whether the set of the VON demands of a size is provisionable, arranged in accordance with at least one embodiment described herein. Although illustrated as discrete blocks, various blocks may be divided into additional blocks, combined into fewer blocks, or eliminated, depending on the desired implementation.

The method 900 may begin at block 902 in which physical network information, VON demands, and a size are read. At block 904, a counter parameter may be initialized. For example, the counter parameter may be initialized to zero. At block 906, a blocked constraint set may be initialized. For example, the blocked constraint set may be initialized to zero.

At block 908, it may be determined whether the counter parameter is less than a max block count parameter. In response to the counter parameter being less than the max block count parameter ("YES" at block 908), the method 900 may proceed to block 910. In response to the counter parameter being greater than or equal to the max block count parameter ("NO" at block 908), the method 900 may proceed to block 920. At block 920 a FALSE is returned. The FALSE indicates that the set of VON demands is not provisionable.

At block 910, it may be determined whether there is a feasible mapping for a feasible mapping function. The feasible mapping function may be applied to the physical network information, VON demands, a minimum provisioned VON set size parameter, a solution quality parameter, and the blocked constraint set. In some embodiments, the feasible mapping function may be represented by a feasible mapping expression mapVON(n, V, d, q, I).

In response to there being the feasible mapping ("YES" at block 910), the method 900 may proceed to block 912. In response to there not being the feasible mapping ("NO" at block 910), the method 900 may proceed to block 920 in which a FALSE is returned.

At block 912, it may be determined whether there is a feasible slot assignment for a slot assignment function. The slot assignment function may be applied to the physical network information, the VON demands, the feasible mapping, and a cost parameter for the slot assignment. In some embodiments, the slot assignment function may be represented by a slot assignment expression a=slotAssign (n, V, m, c).

In response to there being a feasible slot assignment, the method 900 may proceed to block 918. At block 918 a TRUE is returned. The TRUE indicates that the set of VON demands is provisionable.

In response to there not being a feasible slot assignment, the method 900 may proceed to block 914. At block 914, the feasible mapping may be added to the blocked constraint set. At block 916, the counter parameter may be incremented. To increment the counter parameter, a one may be added to the counter parameter.

In some embodiments, one or more of the blocks described with reference to FIG. 9 may be implemented in another of the methods 600, 700, and 800. For example, one or more of the blocks described with reference to FIG. 9 may be included in blocks 810 and/or 820 of the method 800.

The methods 600, 700, 800, and 900 may be performed in an operating environment such as the operating environment 50 of FIG. 1A. The methods 600, 700, 800, and 900 may be programmably performed in some embodiments by the SDON controller 113 and/or a physical node 101/A-G described with reference to FIGS. 1A-2C. The SDON controller 113 and/or a physical node 101/A-G may include or may be communicatively coupled to a non-transitory computer-readable medium (e.g., the memory 508 of FIG. 5) having stored thereon or encoded therein programming code or instructions that are executable by a processor to perform or cause performance of the methods 600, 700, 800, and 900. Additionally or alternatively, the SDON controller 113 and/or a physical node 101/A-G may include a processor (e.g., the processor 504 of FIG. 5) that is configured to execute computer instructions to cause or control performance of the methods 600, 700, 800, and 900.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it is understood that the various changes, substitutions, and alterations could be made hereto without departing from the spirit and scope of the invention.

What is claimed is:

1. A method of mapping virtual optical networks (VONs) to a physical network that includes one or more physical nodes and one or more physical links that connect the physical nodes, the method comprising:
   reading physical network information representative of characteristics of the physical nodes and the physical links, one or more VON demands, and one or more technology constraints of the physical network;
   determining whether an iteration parameter violates an iterative condition that determines whether to continue processing the VON demands;
   in response to the iteration parameter not violating the iterative condition, determining whether there are unprocessed subgroups of the VON demands;
   in response to there being one or more unprocessed subgroups, selecting a subgroup of the VONs;
   computing feasible mapping patterns for the subgroup of the VONs, the feasible mapping patterns including one or more abstract mapping patterns that meet provisioning criteria, and the computing including choosing a first abstract mapping pattern from an abstract mapping pattern set computed for a first VON demand of the VON demands, computing slot-continuous shortest paths between end-points of a first virtual link of the first abstract mapping pattern in the physical network information, designating a concrete path for the first virtual link, and adding the shortest path of the slot-continuous shortest paths to a concrete mapping pattern corresponding to the first abstract mapping pattern;
   finding a size of a largest subset of the subgroup that has one of the feasible mapping patterns and a slot assignment solution, the size of the largest subset including a number of the VONs that can be concurrently mapped to the physical network without violating the provisioning criteria;
   finding a mapping solution of the subset that has a feasible slot assignment that complies with one or more link capacity constraints;
   finding a slot assignment of the mapping solution; and
   implementing the mapping solution in the physical network to configure one or more of the physical nodes and one or more of the physical links according to at least a portion of the VON demands such that a VON is constructed on the physical network.

2. The method of claim 1, wherein the implementing the mapping solution in the physical network occurs in response to the iteration parameter violating the iterative condition.

3. The method of claim 1, further comprising:
   following the finding the slot assignment of the mapping solution, further determining whether there are further unprocessed subgroups of the VON demands;
   in response to there being one or more further unprocessed subgroups of the VON demands, selecting another subgroup of the VONs;
   computing feasible mapping patterns for the other subgroup of the VONs;
   finding a size of another largest subset of the other subgroup that has a feasible mapping and slot assignment solution;
   finding another mapping solution of the other subset that has a feasible slot assignment; and
   finding a slot assignment of the other mapping solution.

4. The method of claim 1, further comprising:
   in response to there not being one or more unprocessed subgroups of the VON demands, updating the iteration parameter to reflect status of a mapping as per a latest iteration of VON processing; and
   determining whether an updated iteration parameter violates the iterative condition.

5. The method of claim 1, wherein the iterative condition includes one or more of:
   all of the VONs are mapped;
   a particular maximum number of iterations are performed;
   an amount of time is passed; and at least one new VON is successfully mapped in the last iteration.

6. The method of claim 1, wherein the computing further includes:
    determining whether the VON demands have been analyzed;
    in response to the VON demands having not been analyzed, selecting a first VON demand of the VON demands that has not been analyzed;
    combinatorially computing an abstract mapping pattern set for the VON demand;
    initializing a concrete mapping set for the first VON demand;
    determining whether the abstract mapping pattern set is analyzed;
    determining whether virtual links of the first abstract mapping pattern are processed;
    in response to the virtual links of the first abstract mapping pattern not being processed, picking a first virtual link from the first abstract mapping pattern;
    removing the physical network information related to one or more nodes or one or more links from previous virtual links of the first abstract mapping pattern; and
    pruning one or more of the slot-continuous shortest paths between end-points of the first virtual link in the physical network information that have insufficient slots,
    wherein the choosing a first abstract mapping pattern from the abstract mapping pattern set occurs in response to the abstract mapping pattern set not being analyzed.

7. The method of claim 6, wherein the computing further includes:
    in response to the virtual links of the first abstract mapping pattern being processed, determining whether the concrete mapping pattern is complete;
    in response to the concrete mapping pattern being complete, adding the concrete mapping pattern to a concrete mapping pattern set;
    in response to the abstract mapping pattern set being analyzed, outputting the concrete mapping pattern set; and
    in response to the VON demands being analyzed, completing the computing of the feasible mapping patterns.

8. The method of claim 1, wherein the finding the size includes:
    initializing a max value parameter to be an absolute value of a number of the VON demands;
    further initializing a min value parameter to be one;
    further initializing a maximum provisionable size parameter to be zero;
    determining whether the VON demands are provisionable;
    in response to the VON demands not being provisionable, determining whether the max value parameter is greater than or equal to the min value parameter;
    in response to the max value parameter being greater than or equal to the min value parameter, setting a mid value parameter equal to a sum of the min value parameter and a floor function applied to half of a difference of the max value parameter and the min value parameter;
    determining whether a set of the VON demands of a size of the mid value parameter or greater is provisionable;
    in response to the set of the VON demands of the size of the mid value parameter or greater being provisionable, updating the maximum provisionable size parameter to be a greater of the mid value parameter and the maximum provisionable size parameter; and
    setting the min value parameter to a sum of one and the mid value parameter.

9. The method of claim 8, wherein the finding the size further includes:
    in response to the set of the VON demands of the size of the mid value parameter or greater not being provisionable, setting the max value parameter to a difference of the mid value parameter and one; and
    in response to the max value parameter being less than the min value parameter, outputting the maximum provisionable size parameter.

10. The method of claim 8, wherein determining whether the set of the VON demands of the size is provisionable includes:
    further reading the size;
    initializing a counter parameter to zero;
    further initializing a blocked constraint set to null;
    determining whether the counter parameter is less than a max block count parameter;
    in response to the counter parameter being less than the max block count parameter, determining whether there is a feasible mapping for a feasible mapping function applied to the physical network information, the VON demands, a slot number parameter, and the blocked constraint set;
    in response to there being the feasible mapping, determining whether there is a feasible slot assignment for a slot assignment function applied to the physical network information, the VON demands, the feasible mapping, and the blocked constraint set; and
    in response to there not being a feasible slot assignment, adding the feasible mapping to a set of blocked mappings and incrementing the counter parameter.

11. A non-transitory computer-readable medium having encoded therein programming code executable by a processor to perform operations comprising:
    reading physical network information representative of characteristics of physical nodes and physical links that connect the physical nodes, one or more VON demands, and one or more technology constraints of the physical network;
    determining whether an iteration parameter violates an iterative condition that determines whether to continue processing the VON demands;
    in response to the iteration parameter not violating the iterative condition, determining whether there are unprocessed subgroups of the VON demands;
    in response to there being one or more unprocessed subgroups, selecting a subgroup of the VONs;
    computing feasible mapping patterns for the subgroup of the VONs, the feasible mapping patterns including one or more abstract mapping patterns that meet provisioning criteria, and the computing including choosing a first abstract mapping pattern from an abstract mapping pattern set computed for a first VON demand of the VON demands, computing slot-continuous shortest paths between end-points of a first virtual link of the first abstract mapping pattern in the physical network information, designating a concrete path for the first virtual link, and adding the shortest path of the slot-continuous shortest paths to a concrete mapping pattern corresponding to the first abstract mapping pattern;
    finding a size of a largest subset of the subgroup that has one of the feasible mapping patterns and a slot assignment solution, the size of the largest subset including a number of the VONs that can be concurrently mapped to the physical network without violating the provisioning criteria;

finding a mapping solution of the subset that has a feasible slot assignment that complies with one or more link capacity constraints;

finding a slot assignment of the mapping solution; and implementing the mapping solution in the physical network to configure one or more of the physical nodes and one or more of the physical links according to at least a portion of the VON demands such that a VON is constructed on the physical network.

12. The non-transitory computer-readable medium of claim 11, wherein the implementing the mapping solution in the physical network occurs in response to the iteration parameter violating the iterative condition.

13. The non-transitory computer-readable medium of claim 11, wherein the operations further comprise:

following the finding the slot assignment of the mapping solution, further determining whether there are further unprocessed subgroups of the VON demands;

in response to there being one or more further unprocessed subgroups of the VON demands, selecting another subgroup of the VONs;

computing feasible mapping patterns for the other subgroup of the VONs;

finding a size of another largest subset of the other subgroup that has a feasible mapping and slot assignment solution;

finding another mapping solution of the other subset that has a feasible slot assignment; and finding a slot assignment of the other mapping solution.

14. The non-transitory computer-readable medium of claim 11, wherein the operations further comprise:

in response to there not being one or more unprocessed subgroups of the VON demands, updating the iteration parameter to reflect status of a mapping as per a latest iteration of VON processing; and determining whether an updated iteration parameter violates the iterative condition.

15. The non-transitory computer-readable medium of claim 11, wherein the iterative condition includes one or more of:

all of the VONs are mapped;

a particular maximum number of iterations are performed;

an amount of time is passed; and at least one new VON is successfully mapped in the last iteration.

16. The non-transitory computer-readable medium of claim 11, wherein the computing includes:

determining whether the VON demands have been analyzed;

in response to the VON demands having not been analyzed, selecting a first VON demand of the VON demands that has not been analyzed;

combinatorially computing an abstract mapping pattern set for the VON demand;

initializing a concrete mapping set for the first VON demand;

determining whether the abstract mapping pattern set is analyzed;

determining whether virtual links of the first abstract mapping pattern are processed;

in response to the virtual links of the first abstract mapping pattern not being processed, picking a first virtual link from the first abstract mapping pattern;

removing the physical network information related to one or more nodes or one or more links from previous virtual links of the first abstract mapping pattern; and pruning one or more of the slot-continuous shortest paths between end-points of the first virtual link in the physical network information that have insufficient slots, wherein the choosing a first abstract mapping pattern from the abstract mapping pattern set occurs in response to the abstract mapping pattern set not being analyzed.

17. The non-transitory computer-readable medium of claim 16, wherein the computing further includes:

in response to the virtual links of the first abstract mapping pattern being processed, determining whether the concrete mapping pattern is complete;

in response to the concrete mapping pattern being complete, adding the concrete mapping pattern to a concrete mapping pattern set;

in response to the abstract mapping pattern set being analyzed, outputting the concrete mapping pattern set; and in response to the VON demands being analyzed, completing the computing of the feasible mapping patterns.

18. The non-transitory computer-readable medium of claim 11, wherein the finding the size includes:

initializing a max value parameter to be an absolute value of a number of the VON demands;

further initializing a min value parameter to be one;

further initializing a maximum provisionable size parameter to be zero;

determining whether the VON demands are provisionable;

in response to the VON demands not being provisionable, determining whether the max value parameter is greater than or equal to the min value parameter;

in response to the max value parameter being greater than or equal to the min value parameter, setting a mid value parameter equal to a sum of the min value parameter and a floor function applied to half of a difference of the max value parameter and the min value parameter;

determining whether a set of the VON demands of a size of the mid value parameter or greater is provisionable;

in response to the set of the VON demands of the size of the mid value parameter or greater being provisionable, updating the maximum provisionable size parameter to be a greater of the mid value parameter and the maximum provisionable size parameter; and setting the min value parameter to a sum of one and the mid value parameter.

19. The non-transitory computer-readable medium of claim 18, wherein the finding the size further includes:

in response to the set of the VON demands of the size of the mid value parameter or greater not being provisionable, setting the max value parameter to a difference of the mid value parameter and one; and in response to the max value parameter being less than the min value parameter, outputting the maximum provisionable size parameter.

20. The non-transitory computer-readable medium of claim 18, wherein the determining whether the set of the VON demands of the size is provisionable includes:

further reading the size;
  initializing a counter parameter to zero;
  further initializing a blocked constraint set to null;
  determining whether the counter parameter is less than a max block count parameter;
  in response to the counter parameter being less than the max block count parameter, determining whether there is a feasible mapping for a feasible mapping function applied to the physical network information, the VON demands, a slot number parameter, and the blocked constraint set;
  in response to there being the feasible mapping, determining whether there is a feasible slot assignment for a slot assignment function applied to the physical network information, the VON demands, the feasible mapping, and the blocked constraint set; and
  in response to there not being a feasible slot assignment, adding the feasible mapping to a set of blocked mappings and incrementing the counter parameter.

* * * * *